(12) United States Patent
Katabathini et al.

(10) Patent No.: US 11,643,326 B1
(45) Date of Patent: May 9, 2023

(54) MULTI-WALL CARBON NANOTUBES CATALYST SYNTHESIS AND USE THEREOF

(71) Applicant: King Abdulaziz University, Jeddah (SA)

(72) Inventors: Narasimharao Katabathini, Jeddah (SA); Bahaa M Abu-Zied, Jeddah (SA); Sulaiman Yahya Alfaifi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/521,068

(22) Filed: Nov. 8, 2021

(51) Int. Cl.
| | | |
|---|---|---|
| *C01B 3/06* | (2006.01) | |
| *B01J 23/75* | (2006.01) | |
| *B01J 21/18* | (2006.01) | |
| *B01J 37/04* | (2006.01) | |
| *B01J 37/00* | (2006.01) | |
| *B01J 37/08* | (2006.01) | |

(52) U.S. Cl.
CPC .............. *C01B 3/065* (2013.01); *B01J 21/185* (2013.01); *B01J 23/75* (2013.01); *B01J 37/0027* (2013.01); *B01J 37/04* (2013.01); *B01J 37/082* (2013.01); *C01B 2203/1052* (2013.01); *C01P 2002/72* (2013.01); *C01P 2002/85* (2013.01); *C01P 2004/03* (2013.01)

(58) Field of Classification Search
CPC ......... C01B 3/065; B01J 21/185; B01J 23/75; B01J 37/0027

USPC .......................................................... 423/652
See application file for complete search history.

(56) References Cited

U.S. PATENT DOCUMENTS

| | | | |
|---|---|---|---|
| 7,108,939 B2 | 9/2006 | Suzuki | |
| 8,871,300 B2 | 10/2014 | Guo | |
| 2009/0155163 A1* | 6/2009 | Kang | ........................ B01J 23/74 502/185 |
| 2012/0283342 A1* | 11/2012 | Dalai | .................... B01J 35/1061 977/752 |
| 2014/0011671 A1* | 1/2014 | Guo | ........................ B01J 31/061 502/159 |
| 2016/0160394 A1* | 6/2016 | Hocke | .................... B01J 37/031 423/447.2 |

OTHER PUBLICATIONS

Cobalt oxide supported multi-walled carbon nanotube catalysts for hydrogen production via sodium borohydride hydrolysis Katabathini Narasimharao et al. Inter. J. Hyd. Energy, v46, pp. 6404-6418 (Year: 2020).*

Effects of Cobalt Loading, Particle size, and calcination condition on Co/CNT catalyst performance in Fischer-Tropsch reactions Omid Akbarzadeh et al. Symmetry, v11, No. 7, pp. 1-18 (Year: 2019).*

(Continued)

*Primary Examiner* — Douglas B Call
(74) *Attorney, Agent, or Firm* — WCF IP

(57) ABSTRACT

Provided is a method for synthesizing cobalt-incorporated carbon nanotubes (Co/MWCNTs). The method includes a step of mixing cobalt acetate, cobalt nitrate, cobalt chloride, or cobalt sulfate with multi-wall carbon nanotubes in a solvent. A method for generating hydrogen by using the Co/MWCNTs as a catalyst component is also provided herein.

15 Claims, 16 Drawing Sheets

(56) References Cited

OTHER PUBLICATIONS

Accurately measuring the hydrogen generation rate for hydrolysis of sodium borohydride on multiwalled carbon nanotubes/Co-B catalysts. Yueqiang Huang et al. J. Hydrogen Energy, V33, pp. 7110-7115 (Year: 2008).*

Hydrogen storage systems based on solid-state NaBH4/CoxB composite: Influence of catalyst properties on hydrogen generation rate. O.V. Netskina et al. Catalysis Today, V 245, pp. 86-92 (Year: 2015).*

Bandal et al., "Cobalt impregnated magnetite-multiwalled carbon nanotube nanocomposite as magnetically separable efficient catalyst for hydrogen generation by NaBH4 hydrolysis", 2017, Journal of Alloys and Compounds 699:1057-1067, Abstract only.

Kazakova et al., "Co/multi-walled carbon nanotubes as highly efficient catalytic nanoreactor for hydrogen production from formic acid" International Journal of Hydrogen Energy, vol. 45, Issue 38, 19420-19430, 2020, Abstract only.

Abdelhamid ,"A review on hydrogen generation from the hydrolysis of sodium borohydride", International Journal of Hydrogen Energy, 46 (2021) 726-765.

Shi et al.,"Carbon nanotubes-promoted Co—B catalysts for rapid hydrogen generation via NaBH hydrolysis", International Journal of Hydrogen Energy, vol. 44, Issue 36, 19868-19877, 2019, Abstract only.

Larrude et al.,"Multiwalled Carbon Nanotubes Decorated with Cobalt Oxide Nanoparticles", Journal of Nanomaterials, vol. 2021, Article ID 695453.

Chen et al., "Cobalt nanoparticles supported on magnetic core-shell structured carbon as a highly efficient catalyst for hydrogen generation from NaBH hydrolysis", International Journal of Hydrogen Energy, vol. 43, Issue 19, 9296-9306, 2018, Abstract only.

Niu et al., "Optimizing preparation of carbon supported cobalt catalyst for hydrogen generation from NaBH4 hydrolysis", Journal of Alloys and Compounds 543:159-166, 2012, Abstract only.

* cited by examiner

MULTI-WALL CARBON NANOTUBES CATALYST SYNTHESIS AND USE THEREOF

FIELD OF THE INVENTION

The disclosure is generally related to a method for synthesizing cobalt oxide supported multi-wall carbon nanotubes (Co/MWCNTs) by using cobalt acetate or cobalt nitrate as a reactant. The disclosure also provides a method for generating hydrogen in the presence of the Co/MWCNTs. In particular, the method includes generating hydrogen in an alkali-free condition.

BACKGROUND

Global warming and environmental pollution observed in recent years are closely related to a massive consumption of fossil fuels. Since hydrogen is a zero-emission fuel that burns with oxygen and can be utilized in fuel cells or internal combustion engines, fuel cells powered by hydrogen as countermeasures against the environmental problems have gained attention in lieu of the internal-combustion engines that each burn a fossil fuel [1-3]. One of the main areas of research in the energy field is to identify and utilize suitable substances for hydrogen production and storage [1]. Alkaline metal hydrides such as lithium borohydride, sodium borohydride and potassium borohydride have been recognized as such substances for their unique properties (e.g., being stable in alkaline solution, capable of releasing hydrogen at room temperature via non-catalytic and catalytic hydrolysis, etc.) [2]. Among different types of alkaline borohydrides, sodium borohydride is the most studied substance because of its non-toxicity, clean hydrogen production and superior hydrogen storage capacity (around 10.8 wt. %) [3]. Sodium borohydride hydrolysis process can be represented as follows:

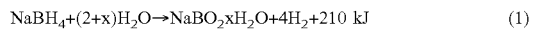

$$NaBH_4 + (2+x)H_2O \rightarrow NaBO_2 xH_2O + 4H_2 + 210 \text{ kJ} \quad (1)$$

$NaBH_4$ hydrolysis reaction is not spontaneous at ambient temperature and needs an appropriate catalyst to generate hydrogen effectively [4]. Thus, an effective synthesis method requires a catalyst to enhance the rate of sodium borohydride hydrolysis [5-18]. Precious metals such as Pt, Rh and Ru were tested for their effectiveness in enhancing the rate of sodium borohydride hydrolysis reaction. However, as the name indicates, the precious metals are precious and thus expensive, resulting in their low utilization rate in energy technology [6, 7, 8].

Alternatively, a cobalt-based catalyst, and particularly cobalt boride alloy, have been contemplated to be a substitute catalyst to noble metals in the hydrolysis reaction of sodium borohydride [10]. The catalytic activity of cobalt-based catalysts can be enriched by dispersing the cobalt metal particles over a suitable support [15]. The support contributes to the surface area of the total catalyst and accommodates better dispersion of the active metal particles. Zhao et al. [19] used the carbon black as a support to disperse the cobalt boride particles and observed the activation energy of sodium borohydride hydrolysis reaction to be substantially reduced. Xu et al. [20] reported a marked activity decrease of Co/C catalysts as a result of increasing the annealing temperature to 500° C. The decrease in catalytic activity was correlated with the phase transformation (i.e., formation of amorphous cobalt hydroxide from cobalt boride) due to increase of the annealing temperature.

Recently, the use of multi-wall carbon nanotubes (MWCNTs) as a support in various important reactions have been reported. MWCNTs possess lengths up to 1.0 μm and outer diameters of 4-30 nm [21]. Such MWCNTs are composed of an assembly of two or more graphite layers. In addition, single-walled CNTs (SWCNTs) with diameters in the range of 0.8-2.0 nm, were successfully synthesized by Tsang et al. [22]. Both SWCNTs and MWCNTs have similar electrical conductivity properties [23, 24]. MWCNTs have a thermal conductivity >3000 W/m·K at room temperature, which is higher than that of basal plane of graphite and diamond (2000 W/m·K) [23, 24]. MWCNTs are quite stiff with high Young's modulus (in the tera-pascal (TPa) range [25]), high tensile strength, and high fracture strength (>100 GPa [26]). Diverse techniques have been used in the synthesis of CNTs, which commonly include chemical vapor deposition (CVD), laser ablation, electric arc discharge, and template methods [23, 24]. Less common techniques such as solar furnace, electrolysis, diffusion flame method, and low temperature solid pyrolysis have also been used [24, 27, 28].

Some exemplary known usages of MWCNTs in reactions include MWCNTs-based support for $CeZrO_2$ and $Ni-CeZrO_2$ catalysts in water gas shift reaction [30]. Sun et al [31] prepared $Cu-ZrO_2$ catalysts supported on N-doped CNTs for the application in $CO_2$ hydrogenation to $CH_3OH$. MWCNTs-supported Cu and $TiO_2$ catalysts that were prepared by the sol-gel routes showed enhanced photocatalytic benzene oxidation to phenol [32]. As a composite material, Saharan et al. [33] successfully utilized $Sn-MnO_2$/CNT composites as catalysts for the anionic dyes (e.g., Indigo carmine) degradation. Ni-CNT composite generated electrocatalytic behavior in hydrogen evolution reaction [34].

However, methods of using MWCNTs in the hydrolysis reaction still requires improvement, and it is still difficult to effectively balance the production and storage of hydrogen in a reaction. What is needed, therefore, is to provide a method for synthesizing a metal-based multi-wall carbon nanotubes composite which can be used as an effective catalyst in hydrogen generation reaction in a simple and affordable manner.

SUMMARY OF THE INVENTION

Aspects of the present disclosure are directed to a method of synthesizing a cobalt based multi wall carbon nanotubes (MWCNTs) catalyst and a method of using such catalyst to generate hydrogen in a sodium borohydride hydrolysis reaction. One of the advantageous features of the present embodiments of using MWCNTs includes stability of the catalyst to pH changes and/or varying reaction temperature. Additional advantages include ease of tailoring into different geomatical shapes, uniform pore size distribution, low cost, and low corrosion rate. A wide range of applications may be contemplated with the use of cobalt based MWCNTs catalysts in the composite catalytic system formation and hydrogen generation. The cobalt supported MWCNTs catalyst of the present invention is manufactured by simple impregnation method, and the synthesized materials are used as heterogeneous catalysts for hydrolysis of sodium borohydride to produce hydrogen. The catalytic properties of the synthesized catalysts correlate with the chemical and structural properties of cobalt supported MWCNTs.

One aspect of the disclosure provides a method of making a carbon nanotubes-based catalyst comprising the steps of mixing a sufficient amount of cobalt salt with multi-wall carbon nanotubes (MWCNTs) in a solvent to produce a solution; drying the solution to form a powdery composition at 70-95° C.; annealing the powdery composition at 400-600° C.; and producing cobalt-incorporated multi-wall carbon nanotubes (Co/MWCNTs). The mixing step may comprise a step of mixing the cobalt salt with MWCNTs in an organic solvent which is selected from the group consisting of ethanol, propanol, and isopropanol. Alternatively, the reaction may be performed in an aqueous solution. The cobalt salts may be selected from the group consisting of cobalt nitrate, cobalt chloride, cobalt sulfate, and cobalt acetate. In preferred embodiments, the cobalt salt is cobalt acetate. In other embodiments, the cobalt salt is cobalt nitrate. In some embodiments, drying step of the method is performed for 12-16 hours. In some embodiments, the annealing step is performed for 30-120 hours. In these embodiments, the sufficient amount of cobalt acetate or cobalt nitrate is the amount determined to achieve 2-30 wt. % of cobalt incorporation in the Co/MWCNTs. In some embodiments, the ratio of cobalt salt to MWCNTs is 1:5 to 1:2.5. In preferred embodiments, the ratio of cobalt salt to MWCNTs is 1:4 to 1:2.8.

Another aspect of the disclosure provides a method of using the cobalt-incorporated multi-wall carbon nanotubes (Co/MWCNTs) in hydrogen production, comprising the steps of mixing Co/MWCNTs produced by the synthesis method which comprises the steps of mixing a sufficient amount of cobalt salt with multi-wall carbon nanotubes (MWCNTs) in a solvent; drying the solution at 70-95° C.; annealing at 400-600° C.; and producing cobalt-incorporated multi-wall carbon nanotubes (Co/MWCNTs) in aqueous sodium borohydride (NaBH$_4$) under conditions suitable for a NaBH$_4$ hydrolysis reaction to release hydrogen; and collecting the released hydrogen. In preferred embodiments, the method does not include a step of adding additional alkali. In some embodiments, the Co/MWCNTs is recycled. In such reactions, the mixing and collecting steps are performed at 25-45° C. In preferred embodiments, the mixing and collecting steps are performed at 30-35° C.

Additional features and advantages of the present invention will be set forth in the description of disclosure that follows, and in part will be apparent from the description of may be learned by practice of the disclosure. The disclosure will be realized and attained by the compositions and methods particularly pointed out in the written description and claims hereof.

DETAILED DESCRIPTION

Figure 1A:
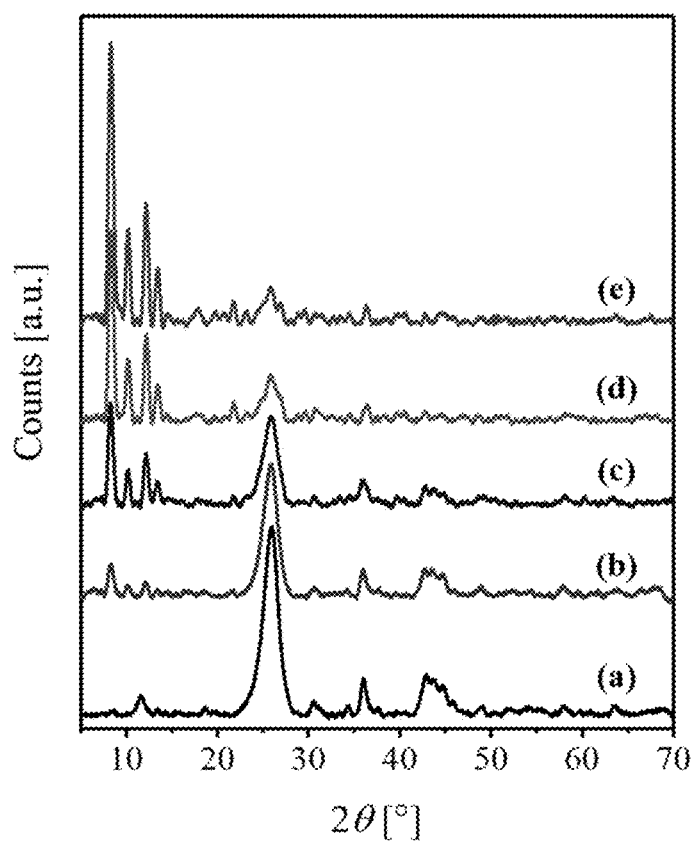
FIGS. 1A-B show XRD pattern graphs representing (A) dried oxide supported multi-wall carbon nanotubes (Co/MWCNTs) with (a) 2 wt. %, (b) 5 wt. %, (c) 10 wt. %, (d) 20 wt. %, or (e) 30 wt. % of loaded cobalt and (B) calcined bulk MWCNTs with (a) 0 wt. %, (b) 2 wt. %, (c) 5 wt. %, (d) 10 wt. %, (e) 20 wt. %, (f) 30 wt. %, and (g) bulk Co(CH$_3$COO)$_2$.4H$_2$O, according to an embodiment of the subject matter described in the disclosure.

The preferred embodiments of the present disclosure are directed toward a synthesis method that provides catalytically active cobalt-incorporated multi-wall carbon nanotubes (Co/MWCNTs) and a method of using the Co/MWCNTs catalyst for a hydrogen generation reaction. A principal object of the disclosure is to provide a low-cost substitute for platinum or other commonly used catalysts which are expensive. Furthermore, the method of using the cobalt incorporated MWCNT catalyst does not require alkaline solution. However, it is also within the scope of this disclosure to incorporate some alkaline solution or presently known expensive material in the catalyst in order to improve the efficiencies thereof. The methods of producing the catalyst or hydrogen disclosed herein have advantages of good reproducibility, simple process, and easy operation.

One aspect of the disclosure provides a method of making a carbon nanotube-based catalyst comprising the steps of mixing a sufficient amount of a cobalt salt with multi-wall carbon nanotubes (MWCNTs) in a solvent; drying the solution at 70-95° C.; annealing at 400-600° C.; and producing cobalt-incorporated multi-wall carbon nanotubes (Co/MWCNTs). In some embodiments, the cobalt salt is selected from the group consisting of cobalt nitrate, cobalt chloride, cobalt sulfate, and cobalt acetate. The term "salt" refers to a chemical compound consisting of an ionic assembly of a positively charged cation and a negatively charged anion, which results in a compound with no net electric charge. The component ions in a salt compound can be either inorganic (e.g., chloride), organic (e.g., acetate), monatomic (e.g., fluoride) or polyatomic (e.g., sulfate).

In preferred embodiments, cobalt acetate is mixed with MWCNTs. In other embodiments, cobalt nitrate is mixed with MWCNTs. In some embodiments, the reaction includes one or more cobalt salts, for example, both cobalt acetate and cobalt nitrate. In these cases, other metallic salts such as iron salts (e.g., ferric nitrate, ferric chloride, ferric sulfate, and ferric acetate) or nickel salts (e.g., nickel nitrate, nickel chloride, nickel sulfate, and nickel acetate) are not included in the reaction. Alternatively, in some embodiments, other metallic salts such as iron salts, nickel salts, and magnesium salts may be added and mixed in addition to the cobalt acetate.

The term "multi-wall carbon nanotubes (MWCNTs)" refers to nested single-wall carbon nanotubes that are weakly bound together by van der Waals interactions in a tree ring-like structure. The structure may be formed as a long straight and parallel carbon layers cylindrically arranged around a hollow tube. The term MWCNTs may be used to refer to double- and triple-wall carbon nanotubes.

The term "supported catalyst" or "catalyst support" refers to a material produced by mixing the catalyst with the support. During the initial heating, water and other volatile compounds are eliminated from the supported catalyst while the active catalyst is being formed. The term "active catalyst" refers to any metal, metal oxide or other metal-derivatives formed during the initial heating of the supported catalyst by the reaction between the support, the catalyst and the gases. The term "metal" refers to a single metal (i.e., Co, Fe, Ni, Cu, V, Mo, etc.) or a mixture of two or more metals.

In some embodiments, the method includes a step of mixing the cobalt acetate or cobalt nitrate with MWCNTs in an organic solvent which is selected from the group consisting of ethanol, propanol, and isopropanol. Alternatively, the reaction may be performed in an aqueous solution. The solution may be dried at 60-99° C., preferably 65-95° C., more preferably 70-95° C. Dried reaction maybe in a powder form, which then undergoes annealing step at 350-650° C., preferably 380-630° C., more preferably 400-600° C. In some embodiments, drying step of the method is performed for 12-16 hours. In some embodiments, the annealing step is performed for 30-120 hours. In these embodiments, a sufficient amount of cobalt acetate or cobalt nitrate is used, and the added amount is determined to be an amount achieving 1-45 wt. % of cobalt incorporation in the Co/MWCNTs, preferably 2-40 wt. % of cobalt incorporation in the Co/MWCNTs, more preferably 20-35 wt. % of cobalt incorporation in the Co/MWCNTs. In other words, the amount of cobalt acetate or cobalt nitrate added as a reactant may be 1-45 wt. % of the amount of Co/MWCNTs, preferably 2-40 wt. % of the amount of Co/MWCNTs, more preferably 20-35 wt. % of the amount of Co/MWCNTs. In some embodiments, the cobalt acetate or cobalt nitrate may be 10-30 wt. % of the Co/MWCNTs in the reaction. In some embodiments, the cobalt acetate or cobalt nitrate may be 25-35 wt. % of the Co/MWCNTs in the reaction.

Another aspect of the disclosure provides a method of using the cobalt-incorporated multi-wall carbon nanotubes (Co/MWCNTs) in hydrogen production, comprising the steps of mixing Co/MWCNTs produced by the synthesis method which comprises the steps of mixing a sufficient amount of cobalt salt with multi-wall carbon nanotubes (MWCNTs) in a solvent; drying the solution at 70-95° C.; annealing at 400-600° C.; and producing cobalt-incorporated multi-wall carbon nanotubes (Co/MWCNTs) in aqueous sodium borohydride (NaBH$_4$) under conditions suitable for a NaBH$_4$ hydrolysis reaction to release hydrogen; and collecting the released hydrogen. In preferred embodiments, the Co/MWCNTs catalyst has a cobalt incorporation amount of 1-45 wt. %, preferably 2-40 wt. %, more preferably 20-35 wt. %. In some embodiments, the Co/MWCNTs catalyst may have 25-35 wt. % of cobalt oxide incorporation. In other words, in some embodiments, the ratio of cobalt salt to MWCNTs is 1:5 to 1:2.5. In preferred embodiments, the ratio of cobalt salt to MWCNTs is 1:4 to 1:2.8.

In preferred embodiments, the method does not include a step of adding additional alkali. The term "alkali" refers to a base that dissolves in water and the dissolved solution has a pH greater than 7. Alkali may also refer to alkali metal cations, same or different, for example cations of lithium, sodium, potassium, rubidium, cesium, and combinations of at least two of the foregoing. Some examples of alkali metal cations are sodium and potassium and combinations of sodium and potassium. In some embodiments, the Co/MWCNTs is recycled. In such reactions, the mixing and collecting steps are performed at 25-45° C. In preferred embodiments, the mixing and collecting steps are performed at 30-35° C.

In some embodiments, reactions may include additional types of metal ions in the solution. Some additional metal ions may be previous metal ions or some metal ions having a good catalytic performance. The precious metal ions can be at least one of gold ions (Au), silver ions (Ag), platinum ions (Pt), rhodium ions (Rh), iridium ions (Jr). The metal ions having a good catalytic performance can be at least one of copper ions (Cu), ferrous ions (Fe), cobalt ions (Co), and nickel ions (Ni). Accordingly, the solution containing metal ions can be a solution of chloroauric acid (HAuCl$_4$), gold chloride (AuCl$_3$), silver nitrate (AgNO$_3$), chloroplatinic acid (H$_2$PtCl$_6$), ruthenium chloride (RuCl$_3$), chlororhodic acid (H$_3$RhCl$_6$), palladium chloride (PdCl$_2$), hexachloroosmic acid (H$_2$OsCl$_6$), hexachloroiridic acid (H$_2$IrCl$_6$), copper sulfate (CuSO$_4$), ferrous chloride (FeCl$_2$), or any combination thereof. In one embodiment, the solution containing metal ions is HAuCl$_4$ aqueous solution.

EXAMPLES

The following description is of the best-contemplated mode of carrying out the invention. This description is made for the purpose of illustrating the general principles of the invention and should not be taken in a limiting sense. The scope of the invention is best determined by reference to the appended claims. The optimization of the described synthesis conditions for high yield was performed by variation of externally controlled parameters of the process, such as composition concentration and temperature in the reaction, procedure of preparation of the catalyst and hydrogen generation, the design and geometry of the experimental setup.

Example 1

Preparation of Cobalt Supported MWCNTs Materials

An exemplary synthesis method and materials used for the method are described herein. MWCNTs were purchased from Ad-Nano Technologies Private Limited, India. The obtained material has the following specifications: purity >99%, average diameter of 10-15 nm, average length of 1-5 μm, amorphous carbon <1%, and surface area of 370 m$^2$ g$^{-1}$. The cobalt acetate and cobalt nitrate were utilized as cobalt precursor for the preparation of the cobalt supported materials. For the preparation of cobalt supported carbon nanotube samples, with cobalt loading in the range 2-30 wt. %, the required amount of cobalt nitrate has been dissolved in distilled water and ethanol mixed solvent and added to MWCNTs with stirring. The obtained mixture was dried overnight at 90° C. The dried powders were annealed at 500° C. (based on TGA analysis of cobalt acetate) in a quartz glass reactor, in presence of $N_2$ flow (100 mL min$^{-1}$), for 1 h. Finally, the products of calcination have been kept in a stoppered bottles for the characterization and the activity measurements tests. The various samples are denoted as Co/MWCNTs-x, where x indicates the cobalt loading, weight %.

Characterization of the Catalysts

Bruker advance-8 diffractometer was used in measuring the powder X-ray diffraction patterns of un-calcined as well as calcined Co/MWCNTs catalysts. The interlayer distance (d hkl) for the various samples was calculated by applying the Bragg equation (2d hkl=$\lambda$/(2 sin $\theta$)) to the major reflection due to (002) plane. The relevant stacking height (Lc) of these samples was computed using Scherrer equation (Lc=K$\lambda$/(($\beta_{002}$ cos$_{002}$)), where K is a proportionality constant (taken as 0.89), $\lambda$ is the X-ray beam wavelength, $\beta_{002}$ is the full width at half peak height, and is the diffraction angle [35]. The $N_2$-physisorption experiments for calcined catalysts were performed with the aid of Quantachrome ASiQ instrument. The operation conditions are measurement temperature $-196°$ C., sample mass $\approx 0.1$ g, degassing temperature 200° C. for 2 h. In order to determine the reducibility of the synthesized materials, $H_2$-TPR measurements have been carried out using CHEMBET-3000 instrument. The TPR profiles were obtained by passing 5% $H_2$: 95% $N_2$ gas mixture (flow rate of 40 cc min$^{-1}$) through the catalyst (around 15 mg) while the temperature increased with a linear rate from 25° C. to 800° C. with temperature ramping rate of 5° C. min$^{-1}$. Electron microscopic examinations of representative Co/MWCNTs-x catalysts have been performed in order to study the morphology and the particle size of these materials. The microscopes utilized were (i) field emission scanning electron microscope (FE-SEM, model JEOL JSM-7600F) and (ii) transmission electron microscope (TEM, model JEOL JEMTH-100 II). The various species located at the surfaces of some selected catalysts have been characterized using the X-ray photoelectron spectrometer (SPECS GmbH). The operation conditions were Al-K$\alpha$ source, 13.5 kV, and $5\times10^{-10}$ mbar. The carbon 1s peak binding energy (BE) of 284.6 eV was used as a reference.

Catalytic Hydrolysis of Sodium Borohydride

Catalytic hydrolysis measurements were performed in a Pyrex round bottom flask reactor and volume of the produced hydrogen was measured by water displacement method [36]. The reaction temperature was maintained by placing the reactor in a hot water bath controlled by a temperature controller. The aqueous sodium borohydride solution was poured into the reaction vessel, and then 30 mg of the catalyst was added. The evolved hydrogen gas during the reaction was then passed through a tube and collected in an inverted burette by water displacement method. The volume of the generated hydrogen was determined by observing the change of the height of the water level in the burettes at different time intervals.

Example 2

Phase Identification by X-Ray Diffraction Analysis (XRD)

The phase identification of the dried and calcined Co/MWCNTs samples was performed by using XRD technique. The pattern for the dried Co/MWCNTs-2 (FIGS. 1A-B) shows an intense reflection at 2$\theta$=25.93° corresponding to (002) plane, which is a diagnostic X-ray reflection for the graphitic materials [30-33, 35, 37-41]. The broad reflections appeared at 2$\theta$=42.88° and 43.63° could be assigned to (100) and (101) planes, respectively [35, 38, 41]. The minor reflections at 2$\theta$=53.98° and 63.54° could be attributed to (004) and (110) planes [41]. Impregnation of the cobalt species (diffractograms b-e, FIG. 1A) is accompanied by the development of new reflections below 2$\theta$=24°, whose intensities were increased with increase of cobalt content from 2 to 30 wt. %. These reflections are located at 2$\theta$=8.32°, 10.22°, 12.19°, 13.45°, 14.55°, 17.85°, 19.79°, 20.69°, 21.75°, and 23.16°, which clearly match with reflections due to the hydrated cobalt acetate hydroxide [$Co_4(CH_3COO)_7$(OH).$2H_2O$] phase with JCPDS file No. 00-022-0583. The detection of this phase suggests the partial decomposition of the cobalt acetate during the overnight drying at 90° C. in the presence of MWCNTs. Meanwhile, the intensities reflections due to MWCNTs were decreased with the increase in the cobalt loading.

XRD patterns of MWCNTs are sensitive to the presence of foreign ions and to the degree of alignment of the nanotubes. Wang et al [37] observed the decrease in intensity of the major XRD reflection located at 2$\theta$=26.42° together with the disappearance of the minor reflections corresponding to the CNTs after deposition of Ni—P over CNTs. Saharan et al. [33] reported the disappearance of reflection corresponding to the (002) plane in case of $MnO_2$/CNT and Sn—$MnO_2$/CNT composites, which was due to the complete $MnO_2$ coverage over the CNTs. In another report, Lamacz et al. [30] similar observations were reported in the case of $CeZrO_2$/CNT and Ni—$CeZrO_2$/CNT catalysts. Concurrently, it was shown that the intercalation of the epoxy resin among the graphene layers of CNTs is associated with a shift of the CNTs reflections to smaller values [35]. With respect to the nanotubes alignment, Cao et al. [38] reported a qualitative dependency of the intensity of XRD reflections and the MWCNTs alignment. Increasing the nanotubes alignment is associated with a decrease of the intensity of reflection due to (002) plane; to the extent of complete disappearance for the well-aligned CNTs. The appearance of many minor XRD reflections besides the previously mentioned major reflections for the non-aligned CNTs and the similar results (2$\theta$ range 30°-40°) are observed in the case of the samples in the present study as shown in FIG. 1A.

TABLE 1

Crystallographic parameters of the calcined bulk MWCNTs and Co/MWCNTs catalysts.

| Sample | 2θ (degrees) | FWHM (rad) | $d_{002}$ (Å) | Lc (Å) | Median number of layers (Lc/$d_{002}$) |
|---|---|---|---|---|---|
| MWCNTs | 25.71 | 2.1334 | 3.4646 | 39.8724 | 11.5 |
|  | 26.32 | 2.0378 | 3.3856 | 41.7911 | 12.3 |
| Co/MWCNTs-2 | 25.87 | 1.9481 | 3.4435 | 43.6829 | 12.7 |
| Co/MWCNTs-5 | 26.01 | 1.8528 | 3.4253 | 45.9451 | 13.4 |
| Co/MWCNTs-10 | 25.92 | 1.7233 | 3.4370 | 49.3783 | 14.4 |
| Co/MWCNTs-20 | 26.13 | 1.5866 | 3.4098 | 53.6487 | 15.7 |
| Co/MWCNTs-30 |  |  |  |  |  |

Figure 1B:
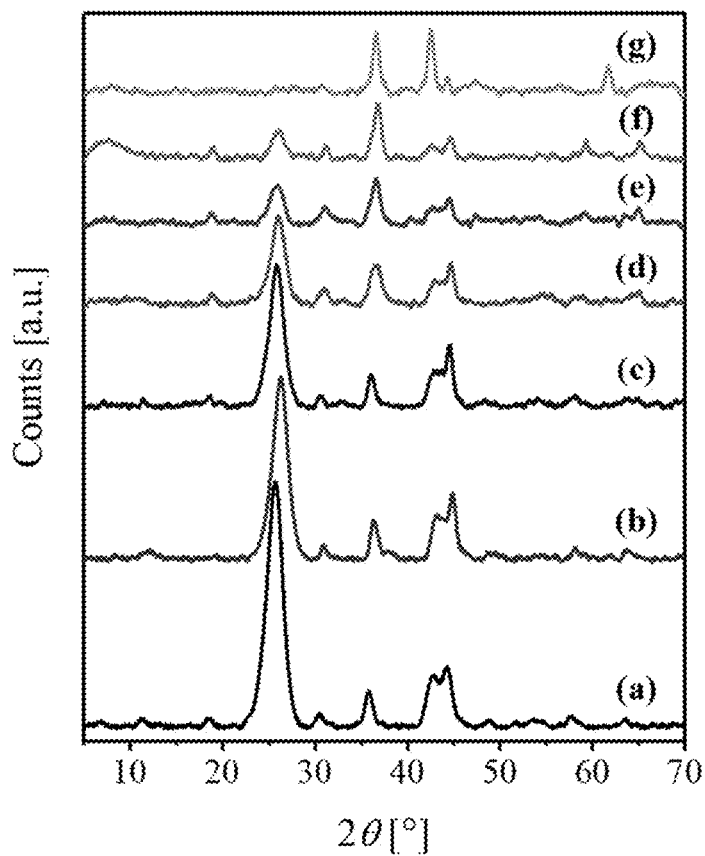
Figure 2A:
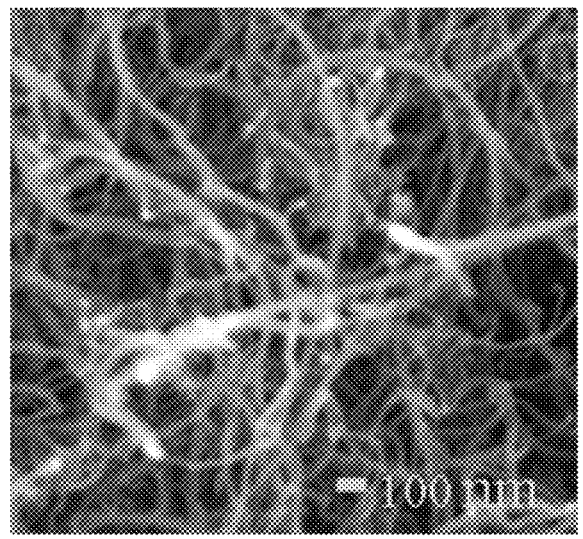
FIGS. 2A-F show SEM images of (A) Co/MWCNTs-2, (B) Co/MWCNTs-10, (C) Co/MWCNTs-30 and TEM images of (D) Co/MWCNTs-2, (E) Co/MWCNTs-10 and (F) Co/MWCNTs-30, according to an embodiment of the subject matter described in the disclosure.
Figure 2B:
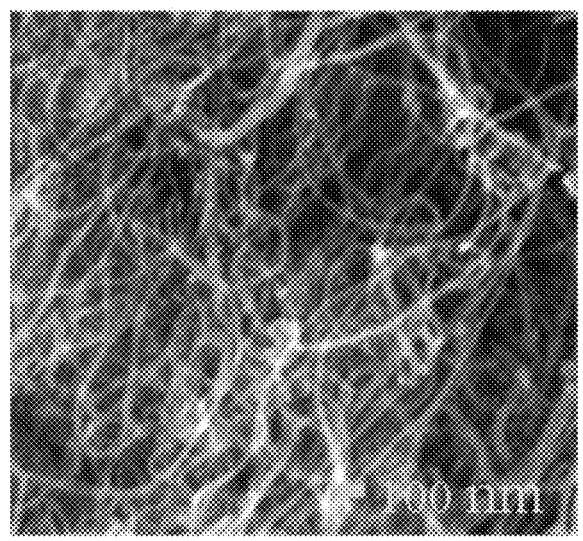
Figure 2C:
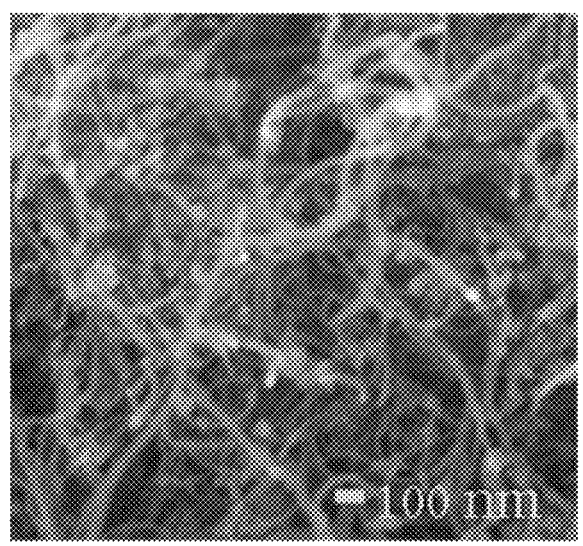
Figure 2D:
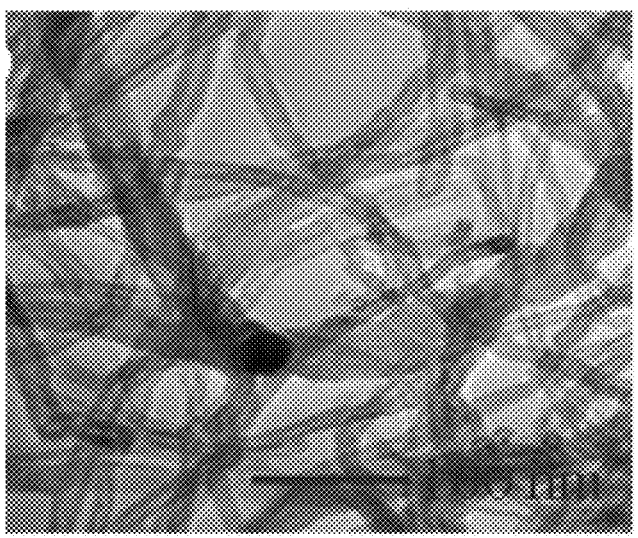
Figure 2E:
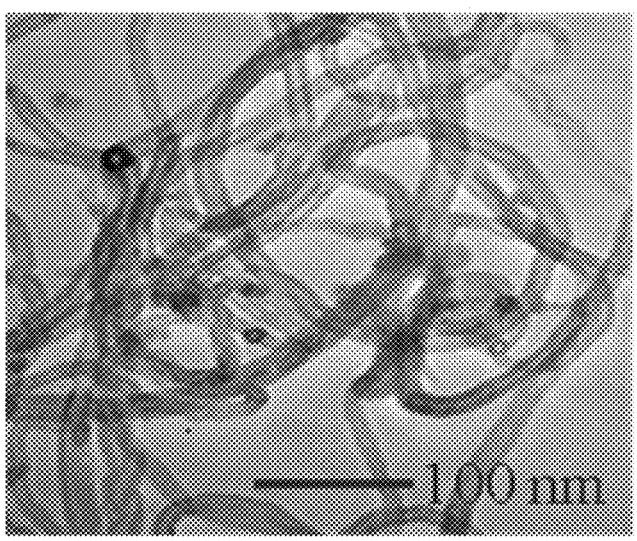
Figure 2F:
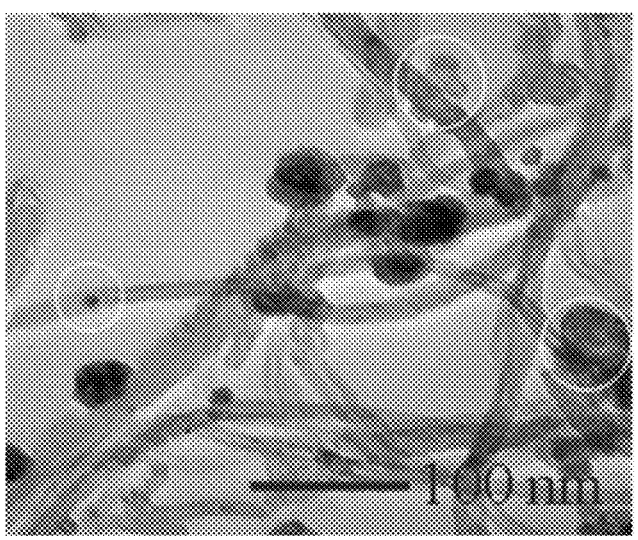
Figure 3A:
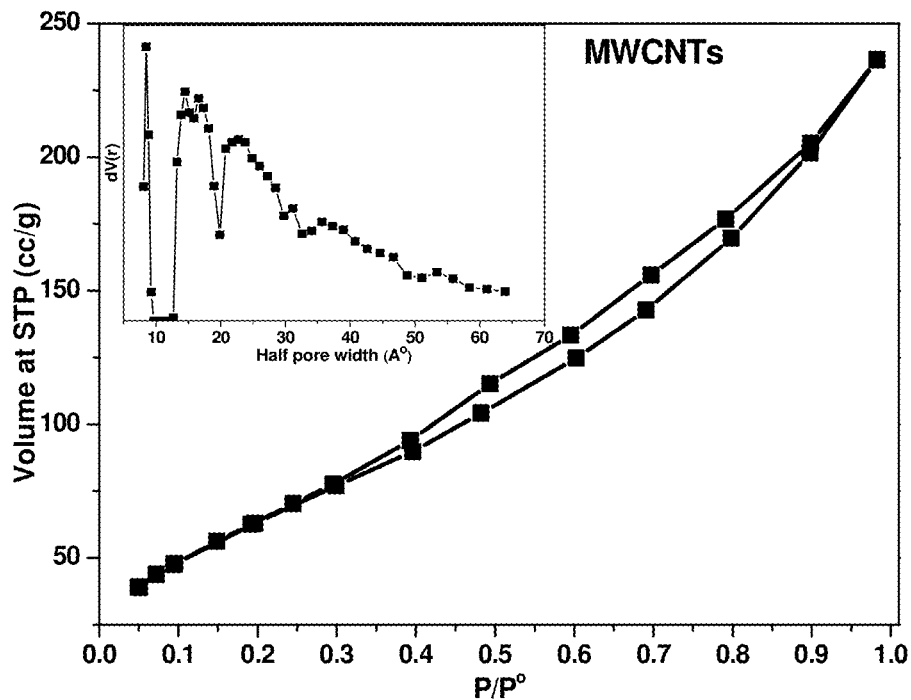
FIGS. 3A-F show graphs representing N$_2$ adsorption-desorption isotherms and pore size distribution patterns of (A) MWCNTs, (B) Co/MWCNTs-2, (C) Co/MWCNTs-5, (D) Co/MWCNTs-10, (E) Co/MWCNTs-20, and (F) Co/MWCNTs-30, according to an embodiment of the subject matter described in the disclosure.
Figure 3B:
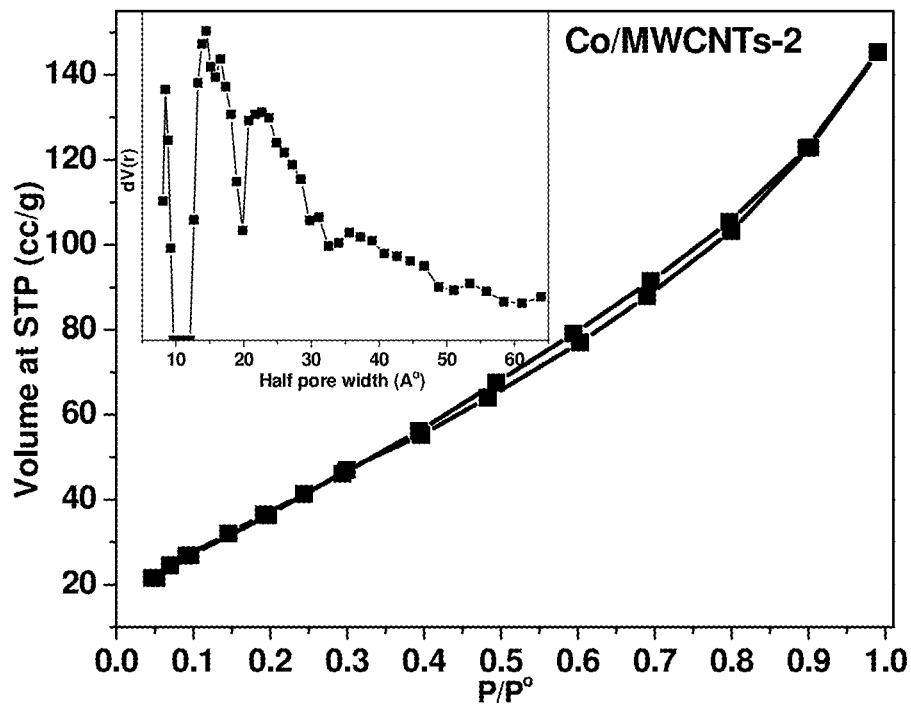
Figure 3C:
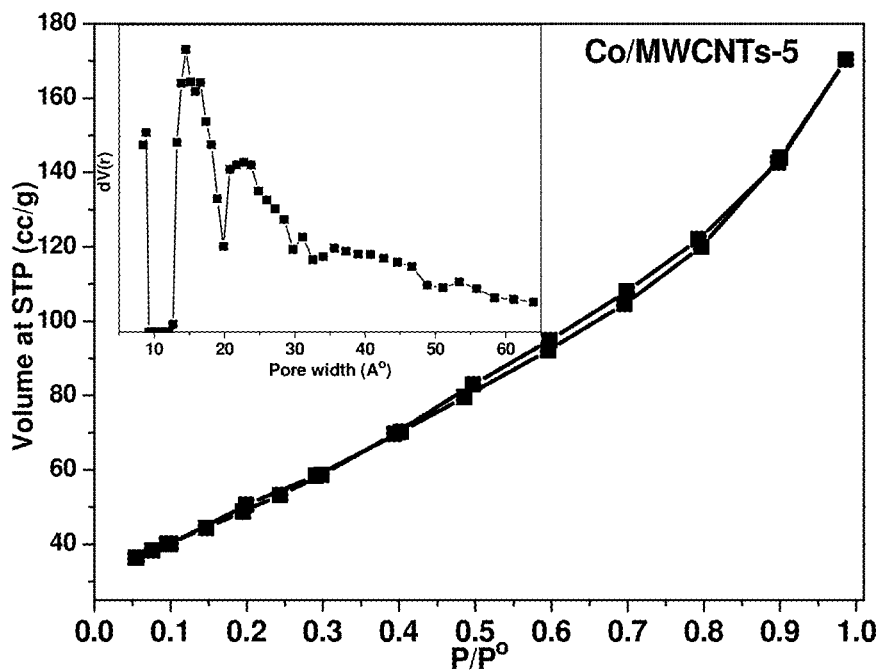
Figure 3D:
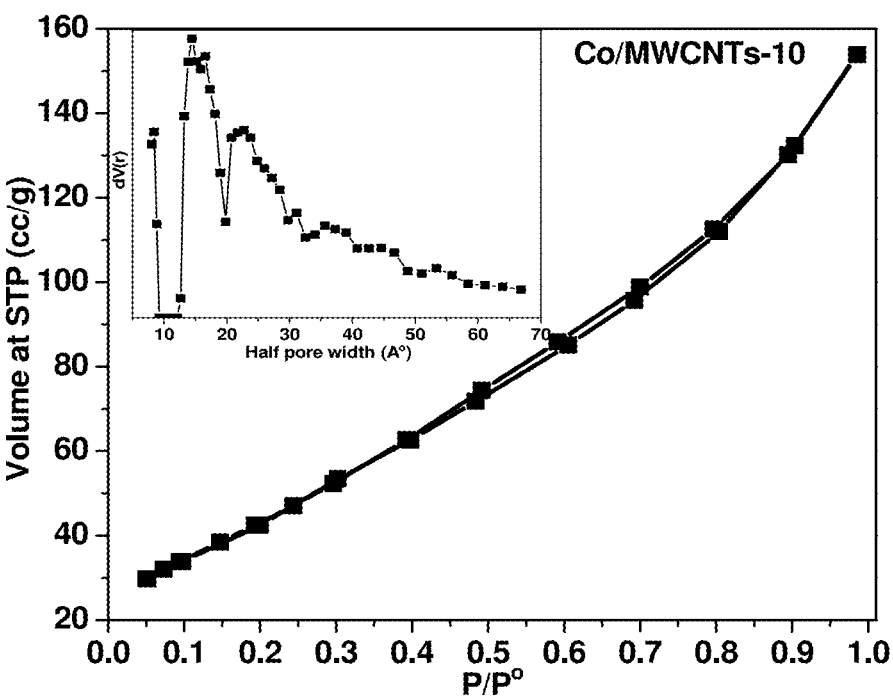
Figure 3E:
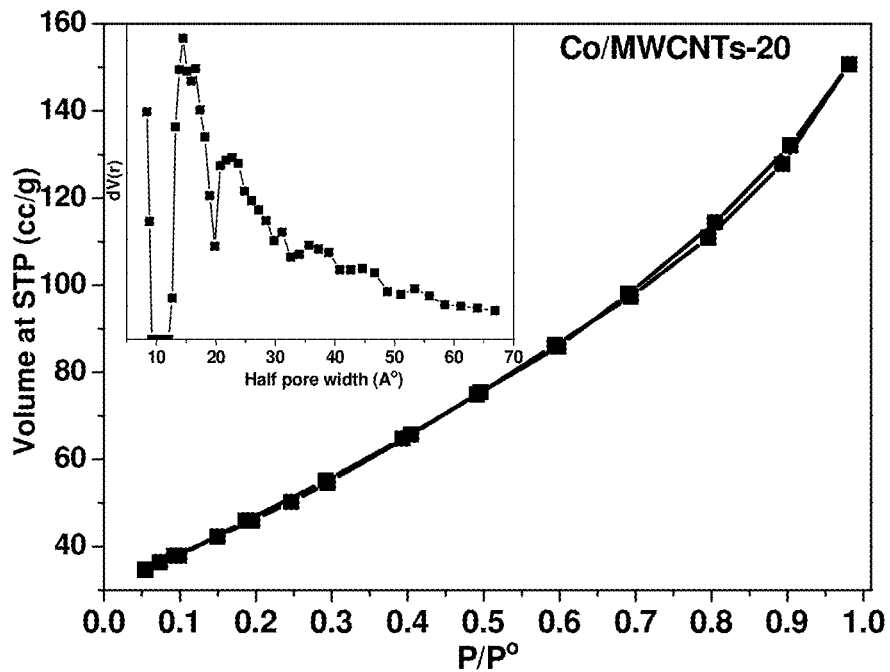
Figure 3F:
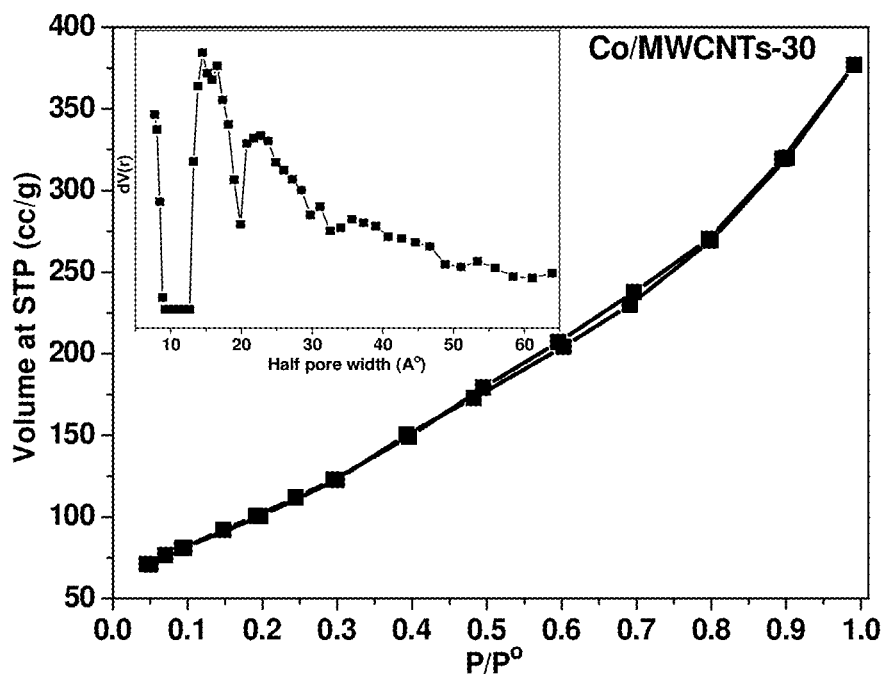

XRD patterns of the calcined samples are depicted in FIG. 1B. Increase of cobalt loading leads to a monotonic decrease of intensity of the reflections corresponding to graphitic layers of MWCNTs. Further, the position of the major reflection shifted from 35.83° to 36.81° together with a continuous intensity increase (FIG. 1B, a-f). On the other hand, new reflections were emerged at 2$\theta$=18.95°, 59.35°, and 65.14°. Bulk cobalt acetate was calcined under the same condition and the XRD pattern of the calcined sample was included for comparison purpose (FIG. 1B, g). The reflections for the calcined cobalt acetate sample at 2θ=30.86° and 44.41° are indexed to the cubic $Co_3O_4$ phase, whereas those appear at 2θ=42.56° and 61.76° could be attributed to the cubic CoO phase. The reflection at 36.64° could be assigned to both phases. The observations indicating that the thermal treatment of bulk cobalt acetate in $N_2$ flow at 500° C. leads to the formation of both $Co_3O_4$ and CoO phases. Similarly, the calcined Co/MWCNTs samples exhibited reflections at 2θ=18.95°, 31.22°, 36.81°, 59.35° and 65.14° revealing that the samples possessed $Co_3O_4$ phase. On the other hand, existence of CoO phase can be realized due to the presence of reflections at 2θ=36.81° and 42.60°. The observed results suggesting that the calcined Co/MWCNTs samples composed of MWCNTs, $Co_3O_4$, and CoO components. The Bragg's law and Scherrer equation were utilized to determine the interlayer distance and the stacking height using the major reflection due to (002) plane and the obtained results are tabulated in Table 1. The measured interplanar distances are close to those reported for MWCNTs in the literature [35, 42]. It is noted that there are no monotonic changes in the interplanar distances with changes in cobalt loading. A gradual increase in stacking heights (Lc) with the cobalt loading indicates the existence of interactions between MWCNTs and cobalt oxides, due to the formation of composites among the solid constituents.

Morphology Studies

The morphological features of the samples have been investigated using FE-SEM and TEM techniques. The images of the representative samples are presented in FIGS. 2A-F. The SEM and TEM images reveal that the fibrous morphology of the MWCNTs is preserved after cobalt loading and the thermal treatment. Both FE-SEM and TEM images reveal the random arrangement of the synthesized Co/MWCNTs-x composites, which agree with the XRD results. The FE-SEM images reveal the 3D dense-network of randomly oriented and tangled CNTs. Moreover, the formation of large size voids due to the distribution of randomly arranged CNTs is observed. The morphology of the CNTs remained intact even after increasing the cobalt loading to 30 wt. % with no improvement of the degree of alignment. Meanwhile, nanosized quasi-spherical $CoO/Co_3O_4$ particles can be seen FIG. 2.

The TEM images (FIGS. 2D-F) demonstrate the formation of intercalated cobalt oxide particles and increase of the cobalt loading to 30 wt. % leads to the formation of relatively large size agglomerates in the range 15-50 nm. Most of these agglomerates exist as anchored particles on the external walls of CNTs. A smaller portion of the cobalt oxides can be seen as encapsulated quasi-spheres (diameters 2-4 nm) inside the MWCNTs. The tubular morphology of MWCNTs offers a unique feature as a host compared to other carbonaceous materials. Chen et al [43] reported that the CNTs possessed electron-enriched exterior and electron-deficient interior surfaces due to the tubular morphology of the CNTs as they are responsible for transfer of π-electrons to convex outer-surface from concave inner-surface. Due to the difference in electron density over the CNTs surfaces, the distribution of the metal-containing species over the interior and exterior surfaces are different [44]. The bulk MWCNTs used in the preparation of Co/MWCNTs composites possessed a higher exterior electron-enriched surface, which has a superior ability over the interior channels to accommodate the cobalt oxides formed during the calcination step. The inner diameter of MWCNTs (<10 nm) is narrow, which may hinder the insertion of metal oxide particles; this could be another factor responsible for the low population of cobalt oxides inside the CNTs channels.

Textural Properties

The textural properties of the investigated samples were studied by $N_2$ physisorption measurements. The adsorption-desorption isotherms and pore size distribution patterns (inset) are shown in FIGS. 3A-F. As shown in the figures, the bulk MWCNTs and Co/MWCNTs samples exhibited the Type II isotherms as per the IUPAC classification [46]. Generally, a non-porous or macro porous material shows the Type II isotherm and it characterizes unhindered monolayer-multilayer adsorption occurring in the investigated samples. The mid-section of the isotherm shows linear adsorption; which is an indication that at this stage monolayer coverage was completed and multi-layer adsorption is going to start. The samples also exhibited $H_3$ type hysteresis generally corresponds to aggregates of plate like particles forming slit-like pores due to voids or spaces of asymmetrical shape and broad pore size distribution [47].

TABLE 2

Textural properties of the investigated samples obtained from $N_2$-physisorption experiments

| Sample | BET surface area (m²/g) | Pore volume (cc/g) | Half pore width (Å) |
|---|---|---|---|
| MWCNTs | 253 | 0.711 | 18.5 |
| Co/MWCNTs-2 | 198 | 0.696 | 14.4 |
| Co/MWCNTs-5 | 184 | 0.660 | 14.5 |
| Co/MWCNTs-10 | 171 | 0.591 | 14.4 |
| Co/MWCNTs-20 | 163 | 0.490 | 14.4 |
| Co/MWCNTs-30 | 150 | 0.377 | 14.4 |

The size of the isotherm hysteresis decreases as Co loading increases; this is mainly due to the deposition of cobalt oxide on to the channels of the nanotubes which subsequently responsible for decrease of condensation of nitrogen gas in the pores. The BET surface area, pore volume and half pore width values for the samples are tabulated in Table 1. As observed, after 30 wt. % Co loading on the MWCNTs, the BET surface area and total pore volume decreased to 150 $m^2g^{-1}$ and 0.377 $cm^3g^{-1}$ from 253 $m^2g^{-1}$ and 0.711 $cm^3g^{-1}$ respectively. The drop in surface area and pore volume values for the Co/MWCNTs catalysts is due to the deposition of cobalt oxide particles inside the CNTs channels [48]. It is interesting to note that the half pore width of the Co loaded MWCNTs is slightly lower than bulk MWCNTs and it is almost same for all the Co loaded MWCNTs samples. This is due to the fact that the pore size distribution peaks (as shown in FIG. 3A-F) observed in the patterns are void spaces generated due to the random arrangement of MWCNTs in the samples. These observations from the $N_2$ adsorption measurements are in good agreement with microscopy results.

Reduction Behavior

Figure 4:
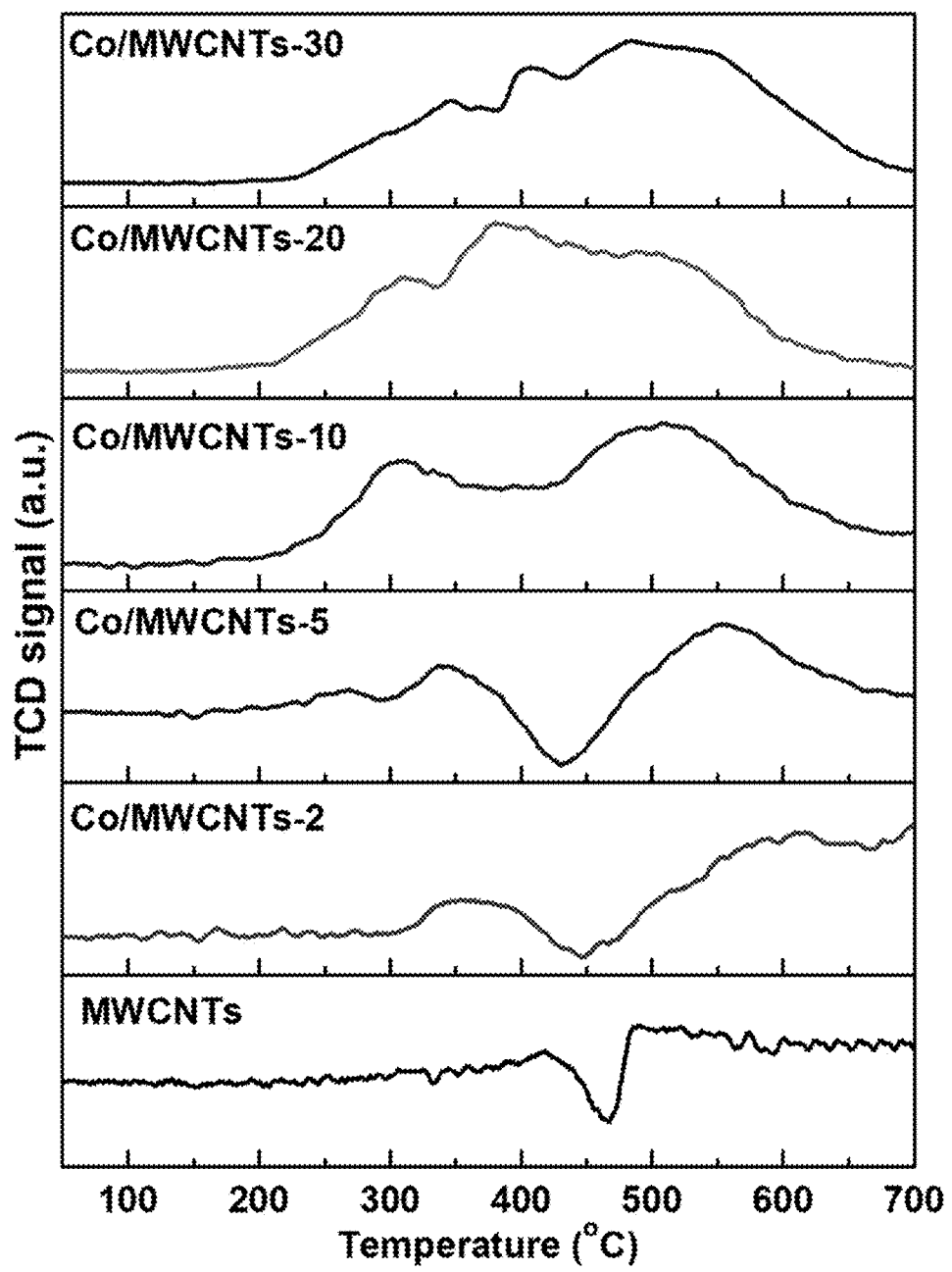
FIG. 4 shows a graph representing H$_2$-TPR patterns of bulk MWCNTs and Co/MWCNTs-2, Co/MWCNTs-5, Co/MWCNTs-10, Co/MWCNTs-20, and Co/MWCNTs-30, according to an embodiment of the subject matter described in the disclosure.

The $H_2$-TPR analysis was used to obtain information regarding the redox properties of the Co/MWCNTs samples. The $H_2$-TPR patterns of bulk MWCNTs and Co/MWCNTs samples are presented in FIG. 4. The $H_2$-TPR pattern of the bulk MWCNTs shows a negative TCD signal around 470° C., which may be due to a release of gaseous products or decomposition of the functional groups presented on the surface of the MWCNTs. Generally, the bulk $Co_3O_4$ is reduced into Co metal in the presence of hydrogen via two steps; $Co_3O_4 \rightarrow 3CoO \rightarrow 3Co$ [49, 50]. The first step occurs at between 200° C. and 300° C. and the second step takes place in the range of 300-450° C. However, three different reduction peaks in the case of Co/MWCNT catalysts (i.e., 50-100°

C., 100-270° C., 270-400° C.) could be attributed to the degradation of residual cobalt nitrate, representing temperature peak at each reduction of $Co_3O_4 \rightarrow CoO$ and $CoO \rightarrow Co$, respectively [51]. Two broad TPR peaks centered at 350° C. and 570° C. were observed in case of Co/MWCNTs-2 and Co/MWCNTs-5 samples. The low temperature reduction peaks (i.e., 50-100° C.) of the decomposition of cobalt nitrate were not observed in the case of the synthesized samples in the present study due to effective calcinations. The appearance of broad reduction peaks at high temperatures in the synthesized samples is a clear indication that the cobalt oxide species are strongly interacted with MWCNTs as they need high temperature to reduce.

The reduction behavior of CNTs and Co/CNTs samples are observed with broad reduction peaks at higher than 475° C., which may be attributed to the CNTs methanation. The peak due to the CNTs methanation is not observed in TPR profile of bulk MWCNT support, this is because of the higher stability of the MWCNTs used in the present study. The Co/MWCNTs-10 sample also exhibited two reduction peaks as similar to those observed in Co/MWCNTs-2 and Co/MWCNTs-5 samples, however, the maximum temperature shifted to lower temperatures to 300° C. and 500° C., respectively. Further increase of Co loading to 20 wt. % or 30 wt. % resulted appearance of a third reduction peak around 400° C. along with two peaks at 300° C. and 500° C. The third peak may be due to the reduction of cobalt oxide species which are interacted with MWCNTs support. The observations from the $H_2$-TPR experiments suggest that cobalt reducibility is affected by the amount deposited on MWCNTs support. The reducibility of cobalt oxides species depends on the particle size. Large cobalt oxide particles were observed in the case of Co/MWCNTs-20 and Co/MWCNTs-30 samples (TEM results). The $H_2$ consumption values for Co/MWCNTs catalysts were determined and the highest $H_2$ consumption was observed for Co/MWCNTs-20 sample (148 μmole). Fu et al. [52] reported that smaller Co particles were more active in the promotion of direct CNT methanation and it is the responsible for the high $H_2$ consumption. However, the synthesized samples have not exhibited TPR peaks due to CNT methanation, therefore the $H_2$ consumption is mainly due to the reduction of Co species and reduction of functional groups on the MWCNTs surface.

XPS Investigation

Figure 5:
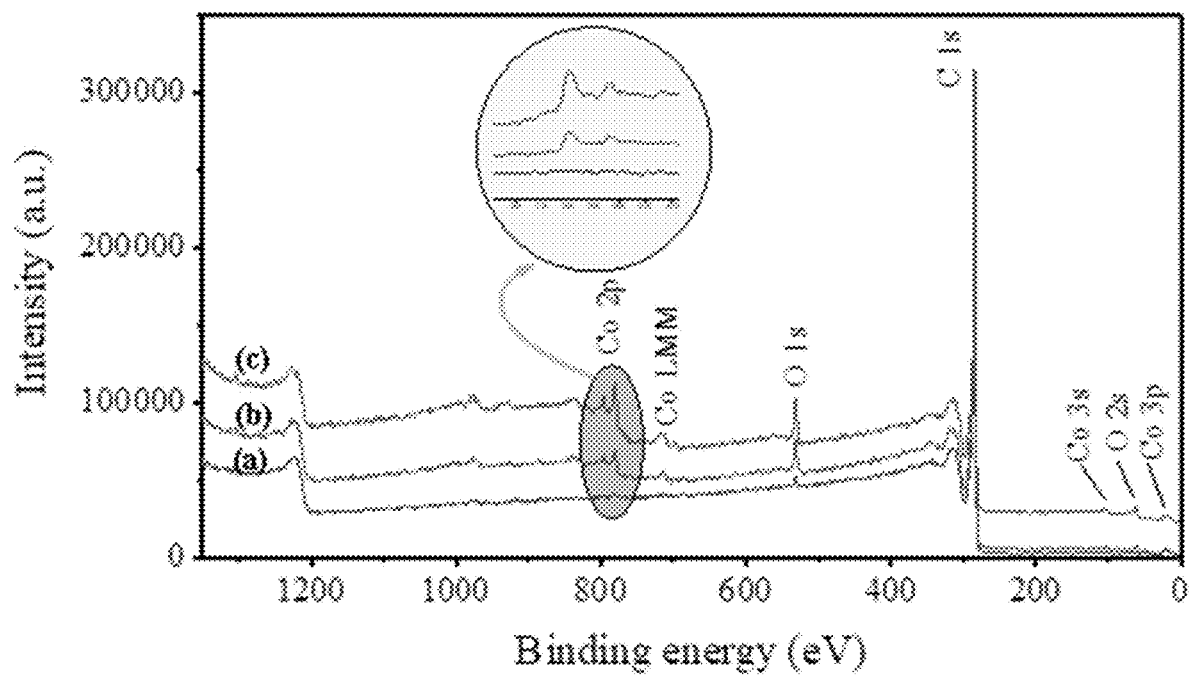
FIG. 5 shows a collection of survey XPS spectra of Co/MWCNTs-2, Co/MWCNTs-20, and Co/MWCNTs-30, according to an embodiment of the subject matter described in the disclosure.

The nature of surface species presented on the catalyst and surface elemental composition of the synthesized Co/MWCNTs samples have been investigated using XPS technique. The survey spectra of Co/MWCNTs-2, Co/MWCNTs-20, and Co/MWCNTs-30 composites are shown in FIG. 5. The obtained spectra indicate the co-existence of Co, C, and O atoms on the surface of catalysts, which reflects the purity of the MWCNTs support used in the synthesis of composite samples. The magnified section (inset of the figure), which represents Co 2p core XP spectra reveal the absence of cobalt species on the surface of Co/MWCNTs-2 sample. This is because the X-rays utilized in the XPS instrumentation has the small penetration depth (e.g., 4-5 nm) and the cobalt oxide species in this sample are located in the interior channels of the MWCNTs. However, clear Co 2p XP peaks were observed for all the other synthesized samples.

Figure 6A:
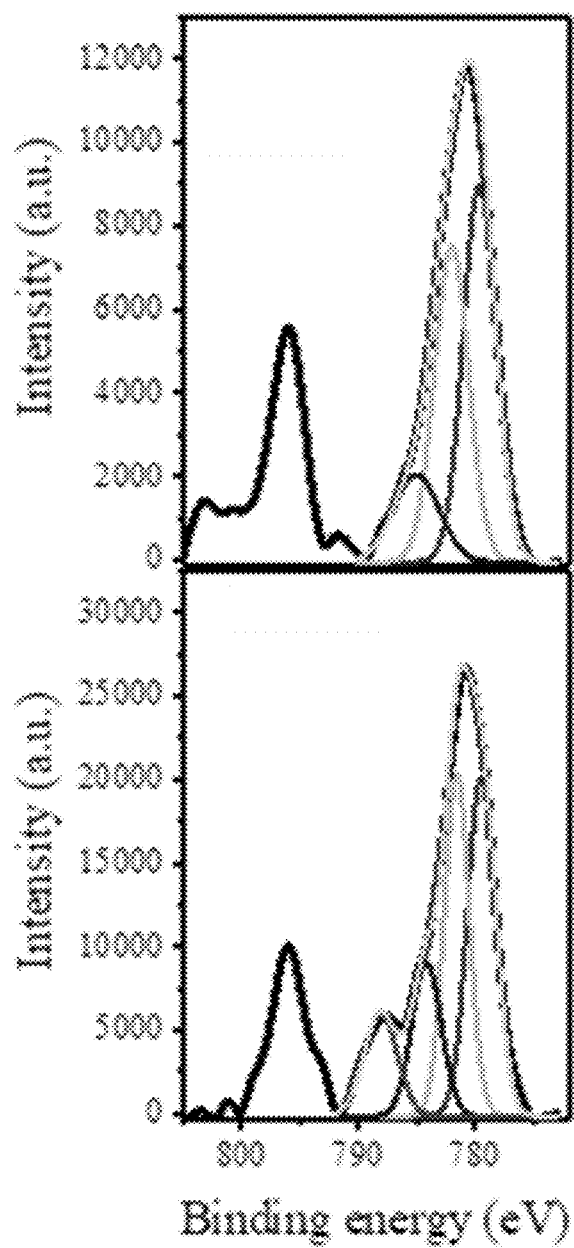
FIGS. 6A-C show XPS spectra of Co/MWCNTs-20 (top) and Co/MWCNTs-30 (bottom) representing (A) Cobalt 2p, (B) Oxygen 1s, and (C) Carbon 1s, according to an embodiment of the subject matter described in the disclosure.

The Co 2p core spectrum of Co/MWCNTs-20 sample (FIG. 6A, top panel) shows two main peaks at binding energy (BE) values of 780.7 eV and 796.0 eV, attributable to the Co $2p_{3/2}$ and Co $2p_{1/2}$ spin-orbit peaks, respectively [53]. The energy difference of between the two peaks (15.3 eV) suggests the co-existence of $Co^{2+}$ and $Co^{3+}$ ions on the surface of this material [54]. The deconvolution of the Co $2p_{3/2}$ component yields three peaks (FIG. 6A, bottom panel). The peaks at 779.65 and 782.06 eV could be associated with the presence of $Co^{3+}$ and $Co^{2+}$ ions at the surface of these solids, respectively [55]. The peak appear at BE=785.09 eV could be assigned as a shake-up satellite peak of $Co_3O_4$ [56]. Similarly, three XPS peaks can be observed in the deconvoluted Co $2p_{3/2}$ component of Co/MWCNTs-30 sample at BEs of 779.45 eV, 781.61 eV, and 784.21 eV, respectively. In addition, a fourth peak emerged at BE of 788.12 eV, which could be attributed to a shake-up satellite peak for CoO or CoO(OH) phases [57]. It is to be noted that the intensities of the Co 2p peaks of Co/MWCNTs-20 sample are higher than those of Co/MWCNTs-30 due to the high cobalt content on the surface in the former sample.

Figure 6B:
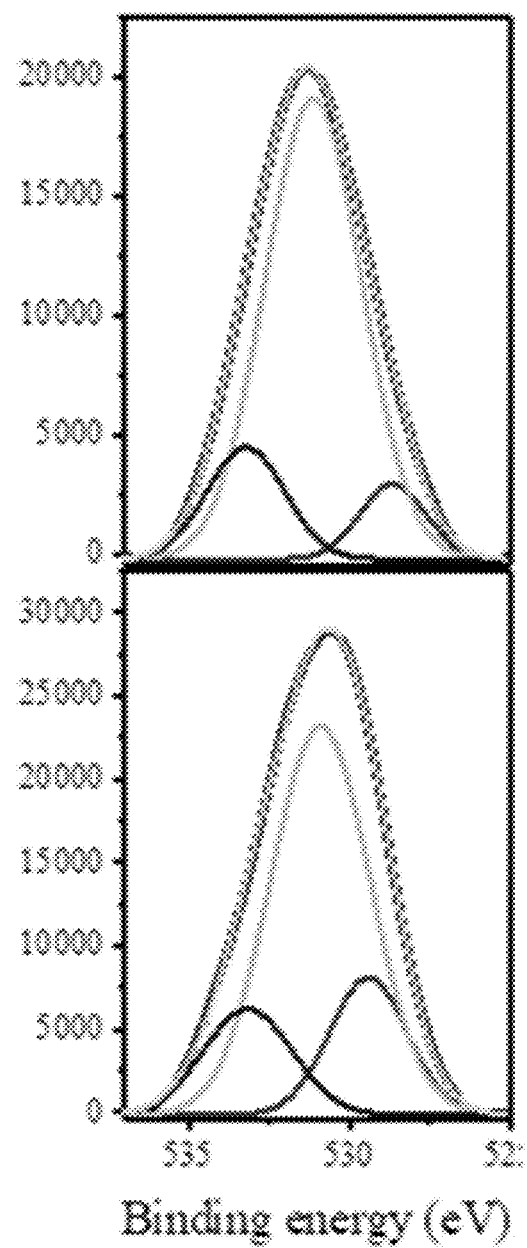
Figure 6C:
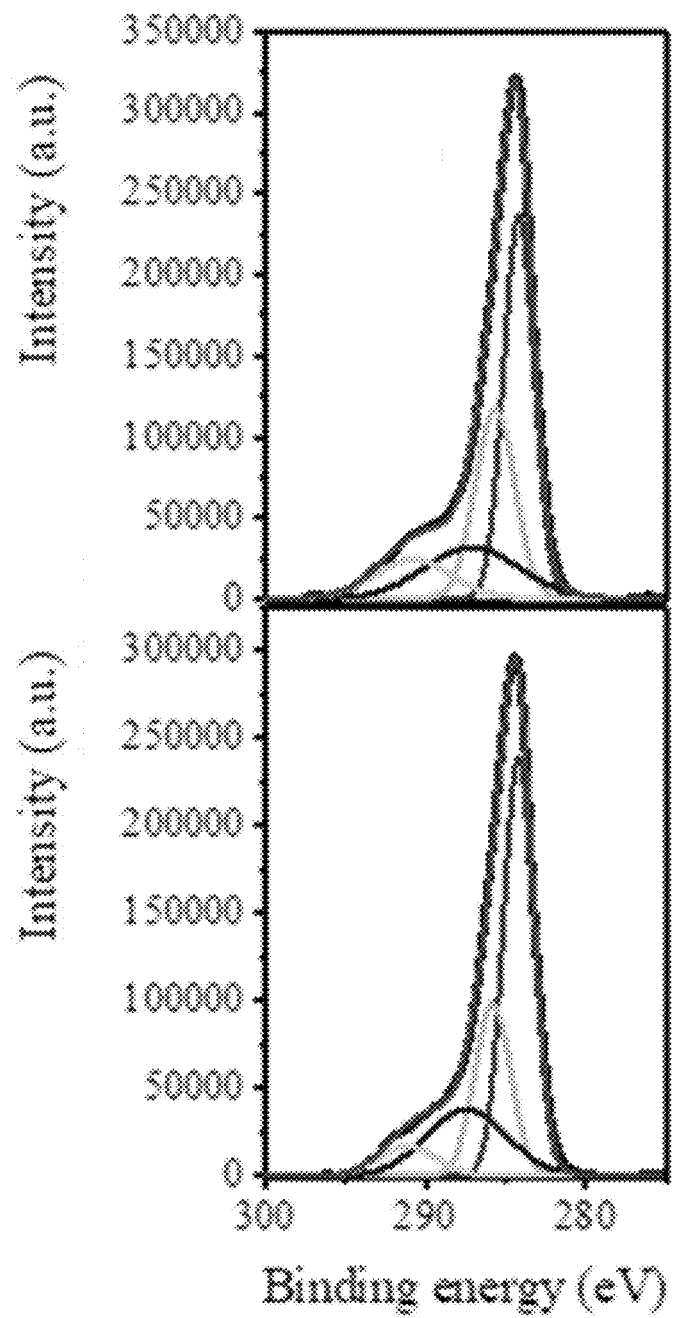

Asymmetric O 1s peaks can be seen for both composites as shown in FIG. 6B. The peak fitting yields three different species for both samples, which are located at BEs of 528.64 eV, 531.12 eV, and 533.21 eV for Co/MWCNTs-20 sample. The first two peaks could be assigned to the lattice and adsorbed oxygen species, respectively [58]. The third peak could be indexed to the oxygen in the C=O and/or C—O—C functional groups [59] presented at the surface of materials. These three XP peaks appear at BEs of 529.40 eV, 530.89 eV, and 533.15 eV for Co/MWCNTs-30 sample. The intensity of the XPS peaks for these components is high for the sample due to a large concentration of cobalt oxides presented on the surface. In this context, it is important to note that O 1s peaks were observed in the case of bulk MWCNTs support, which could be attributed to the functional groups attached to CNTs surface arising from the purification process, a similar observation was reported for graphene-containing materials [59]. Inspection of the C 1s spectra for both samples reveal the presence of asymmetric XP peak with tailing at high Bes, as shown in FIG. 6C. The intensity of this peak is higher for Co/MWCNTs-20 sample due to the low cobalt loading. The deconvolution of C 1s peak for Co/MWCNTs-20 sample yielded four components at BEs of 284.19 eV, 285.67 eV, 287.12 eV, and 290.82 eV corresponding to C=C, C—C(and/or C—O), C=O, and O=C—O functional respectively [60]. These assignments consist with those reported for the C 1s deconvoluted XPS spectra of bulk MWCNTs [60], graphene [59], and other carbonaceous materials [59, 60]. The fitted C 1s peak of Co/MWCNTs-30 sample shows the presence of these four peaks at BEs of 284.2 eV, 284.8 eV, 287.4 eV, and 291.1 eV indicating that the surface MWCNTs structure have not changed after the high cobalt loading.

Example 3

Figure 7A:
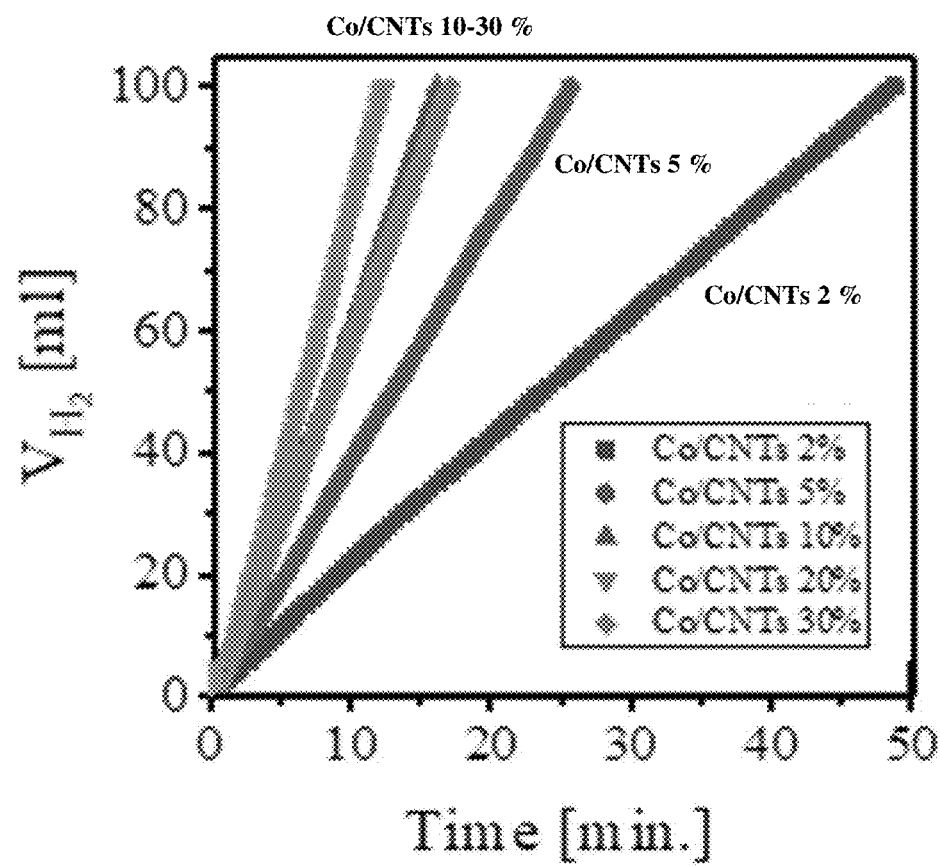
FIGS. 7A-D show plots of the evolved hydrogen versus reaction time for Co/MWCNTs catalysts with varying concentrations (i.e., 2-30 wt. %) at a different reaction temperature of (A) 30° C., (B) 35° C., (C) 40° C. or (D) 45° C. 30 mg of the Co/MWCNTs catalyst was used for each reaction, according to an embodiment of the subject matter described in the disclosure.
Figure 7B:
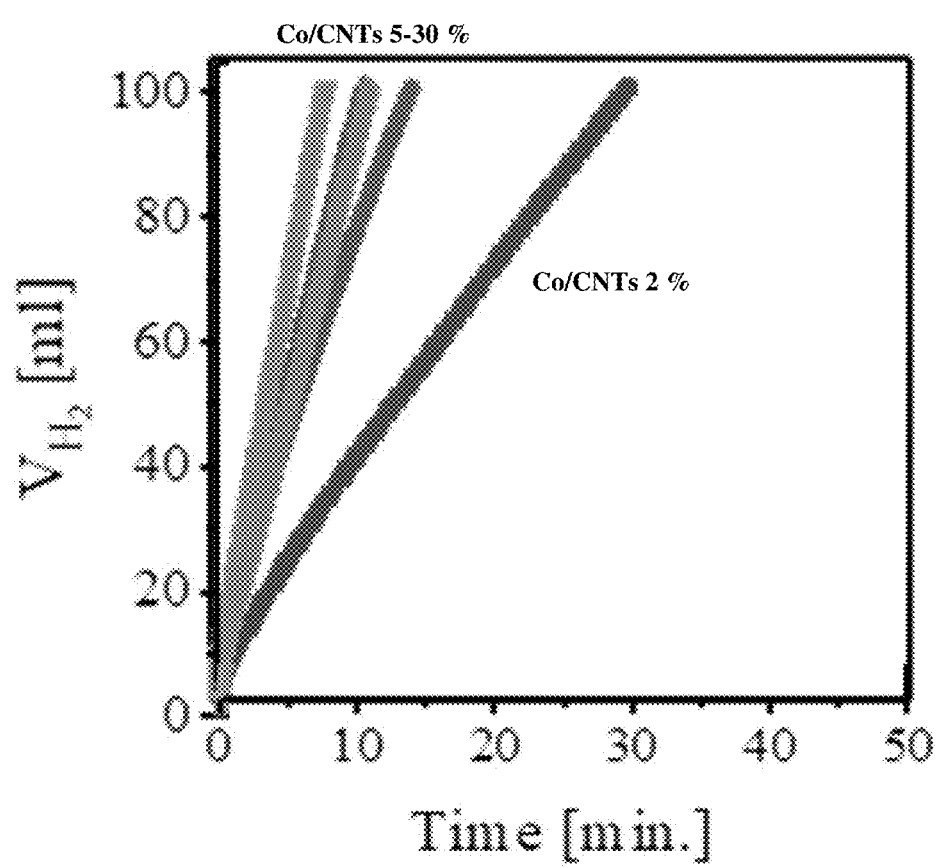
Figure 7C:
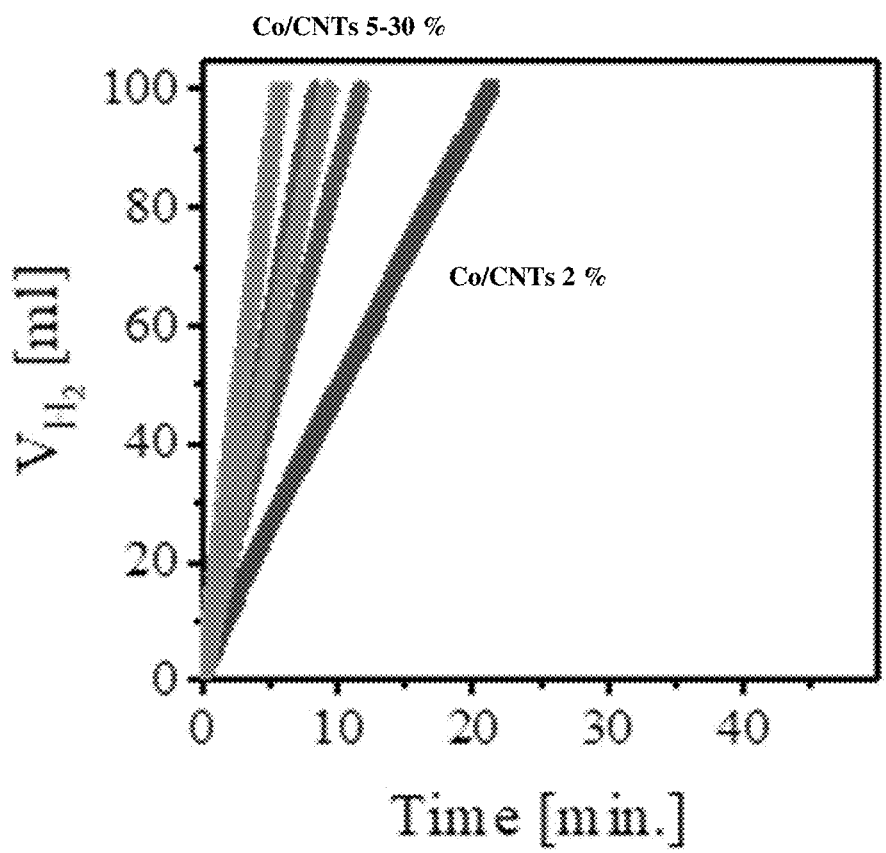
Figure 7D:
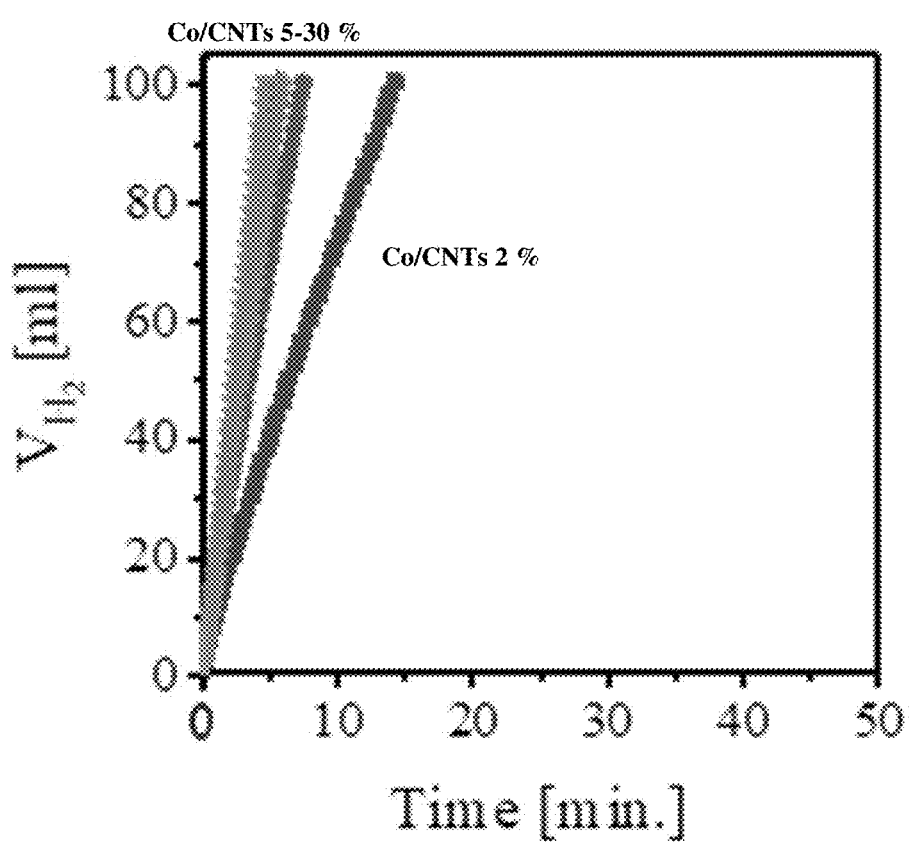

Hydrolysis of Sodium Borohydride
Effect of Cobalt Loading and Reaction Temperature The catalytic activities of the synthesized Co/MWCNTs samples were investigated in the hydrolysis of $NaBH_4$. Initially, influence of Co loading and the reaction temperature on the hydrogen production were studied. FIG. 7A presents the plots of hydrogen volume versus the reaction time for the investigated Co/MWCNTs samples at different reaction temperatures in the range of 30-45° C.

It can be observed from FIG. 7 that with increase of the reaction temperature from 30° C. to 45° C., there is a significant change in the time required to reach a fixed volume of hydrogen (100 mL) as a result of $NaBH_4$ hydrolysis in case of Co/MWCNTs-2% catalyst. To produce 100 mL of hydrogen, 50 minutes time is required at 30° C., while it takes place at 35° C. in 30 minutes, at 40° C. in 20 minutes and at 45° C. it requires only 15 minutes. With increase of Co loading from 2 wt. % to 10 wt. %, less reaction time is required to produce 100 mL of hydrogen, whereas when the Co loading is more than 10 wt. %, more reaction time is required for 100 mL of hydrogen generation. It is also interesting to note that all the catalysts showed linear activation energy for the catalytic hydrolysis of $NaBH_4$ reaction. The figure shows the plots of ln (HGR) versus the reciprocal absolute temperature for the various tested Co/MWCNTs catalysts. The activation energies, $E_a$ (kJ $mol^{-1}$), have been obtained from the slopes of the plotted lines.

TABLE 3

$NaBH_4$ hydrolysis activity data comparison between Co/MWCNTs and some other reported cobalt-based catalysts

| Catalyst | Preparation method | Measurements conditions | | | | HGR (mL $min^{-1}$ $g^{-1}$) | Activation energy (kJ $mol^{-1}$) |
| --- | --- | --- | --- | --- | --- | --- | --- |
| | | Catalyst: $H_2O$ (wt. %) | $NaBH_4$: $H_2O$ (wt. %) | Temp. (° C.) | NaOH concentration (wt. %) | | |
| Co/C nanoparticles | Basil leaves extract | 0.025 | 1.0 | 25 | — | 993 | 52.4 |
| | | | | 35 | | 1821 | |
| $CO_3O_4$ | Commercial | 5.0 | 10.0 | 25 | 8.0 | 860 | 77.9 |
| Co—B/C | Impregnation | 2.5 | 1.0 | 25 | 5.0 | 166 | 44.1 |
| Co powder | Commercial | 2.5 | 1.0 | 20 | 10.0 | 126.2 | 41.9 |
| Raney Co | arc-melting | 2.5 | 1.0 | 20 | 10.0 | 267.5 | 53.7 |
| Octahedral CoO | Chemical solution | 0.167 | 10.0 | 30 | 10.0 | 5950 | — |
| Near-spherical CoO | Chemical solution | 0.167 | 10.0 | 30 | 10.0 | 5890 | — |
| Co—La—Zr—B | Ultrasound-assisted reduction | 0.05 | 5.0 | 30 | 2.0 | 216 | 60.1 |
| Co/MWCNTs-2 | Impregnation/annealing | 0.15 | 1.0 | 35 | — | 109 | 63.8 |
| Co/MWCNTs-5 | Impregnation/annealing | 0.15 | 1.0 | 35 | — | 231 | 61.3 |
| Co/MWCNTs-10 | Impregnation/annealing | 0.15 | 1.0 | 35 | — | 306 | 54.9 |
| Co/MWCNTs-20 | Impregnation/annealing | 0.15 | 1.0 | 35 | — | 410 | 51.3 |
| Co/MWCNTs-30 | Impregnation/annealing | 0.15 | 1.0 | 35 | — | 295 | 53.8 | dependence with the absence of the induction period reported for other catalytic systems [36, 61-64].

Figure 8A:
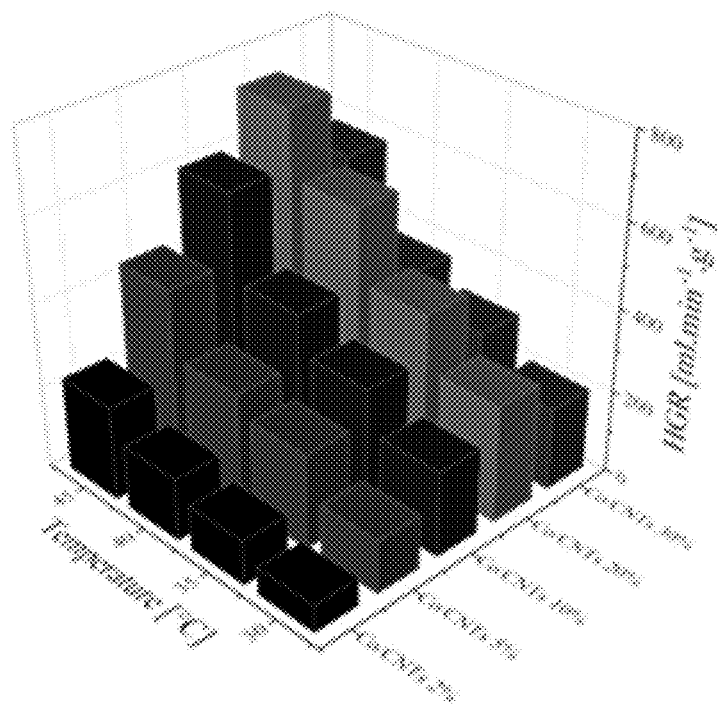
FIGS. 8A-C show (A) hydrogen generation rate (HGR), (B) Arrhenius plots, and (C) Constable-plots in the reactions of Co/NWCNTs with varying concentrations (i.e., 2-30 wt. %), according to an embodiment of the subject matter described in the disclosure.
Figure 8B:
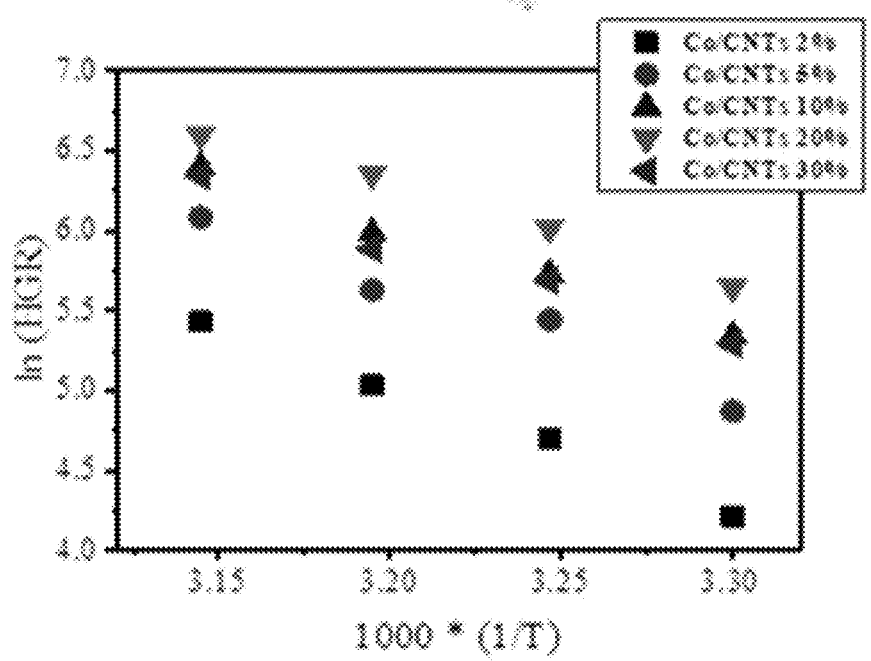
Figure 8C:
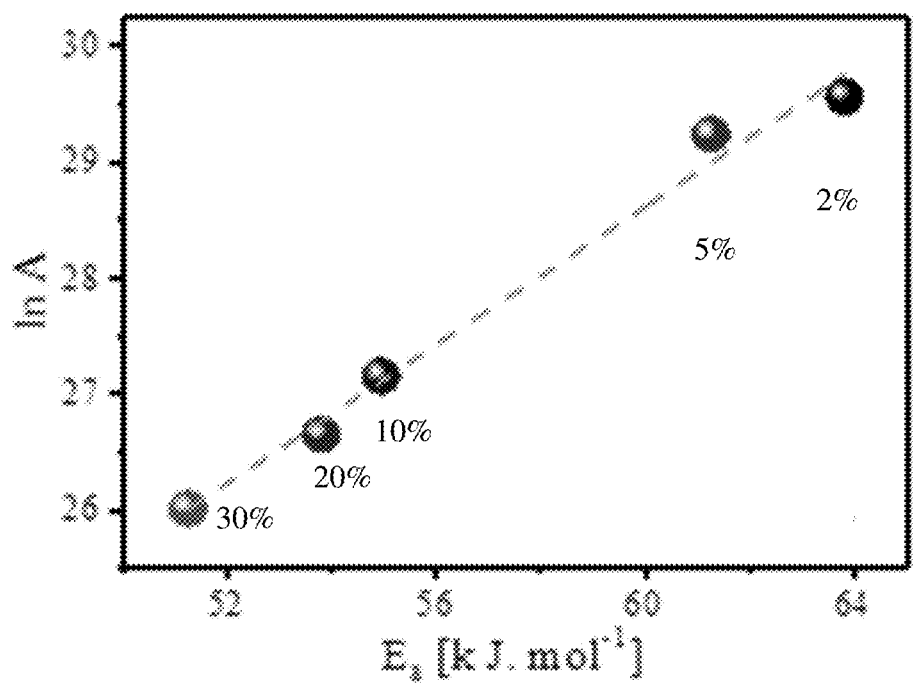

It is possible to determine the reaction rate constant and activation energy from the reaction time at different temperatures. The hydrogen generation rates (HGR) for all the catalysts were obtained from the slopes of the linear fitted data and the obtained values are presented in FIG. 8A. The results are revealing that the HGR is dependent on both reaction temperature and cobalt loading. The increased $NaBH_4$ hydrolysis activity when the cobalt loading reached to 10 wt. % suggests that the active sites are originating from the cobalt oxides. On the other hand, further increase of cobalt loading to 20 wt. % and 30 wt. % resulted changes in the catalytic activities. Increase of Co loading enables the catalyst to possess a greater number of active sites for the $NaBH_4$ molecules to react; thus catalytic activity should be increasing continuously, but it's not the case. Therefore, additional parameter contributes to such activity changes. The electron microscopy results indicated the aggregation of cobalt oxides in case of Co/MWCNTs-30 catalyst (FIG. 2A-F). Such particle aggregation was suggested to decrease the activity of CoB catalyst during $NaBH_4$ hydrolysis and hinder its reusability [63]. From the data shown in FIG. 8A, it seems that the optimal Co loading for the hydrolysis of $NaBH_4$ is determined to be 10 wt. % in case of MWCNTs investigated in the present work. This is probably due to the fact that the Co/MWCNT-10 catalyst possesses superior physico-chemical properties which are responsible for the enhancement in rate of catalytic hydrolysis reaction. The Arrhenius plots FIG. 8B were used to calculate the apparent Table 3 compares the obtained kinetic parameters of the synthesized Co/MWCNTs catalysts and some other cobalt-based catalysts. The observed HGR values for the Co/MWCNTs catalysts are comparable with some active Co based catalysts. The $NaBH_4$ hydrolysis reactions in the presence of various catalysts are controlled by the concentration of the active phase, the crystal defects, the number of surface coordinating unsaturated sites, pre-treatment conditions, and the isotropic phase nature of the materials [36, 63]. For instance, bulk $Co_3O_4$ [62] and Co/C [68] catalysts annealed at 600° C. were more active than those that were annealed at 700° C. and 800° C. Ozerova et al. [69] utilized different types of cobalt containing materials for $NaBH_4$ hydrolysis and the authors observed catalytic activity in the following order; $CoO>Co_3O_4>CoCl_2.6H_2O>CoBO>CoCO_3.Co(OH)_2.0.22H_2O>CoOOH>CoCO_3.3Co(OH)_2H_2O$. Lu et al. [66] reported that octahedral CoO was superior to sphere-like CoO catalysts for the $NaBH_4$ hydrolysis, and Huang et al. [70] observed that the $Co_2P$ nanowires exhibited higher HGR compared to $Co_2P$ nanoparticles. Further, the CoB supported $SiO_2$ is four times active than the bulk CoB catalyst for $NaBH_4$ hydrolysis [63]. The solution is another important parameter to pay attention to while comparing the activities of different catalysts for $NaBH_4$ hydrolysis reaction [63, 65-67, 70]. Increasing the concentration of NaOH from 1 to 10 wt. % resulted a continuous activity increase in the case of $Co_2P$ catalyst [70]. Similarly, the high activity of Co/C NPs prepared by the basil leaf extract was related to the presence of K and Ca ions in these catalysts [63, 65-67, 70]. The presence of these ions, which originated from leaves extract, increased the basicity of the solution and subsequently enhanced the hydrolysis activity. Although, Co/C NPs offered better activity compared to Co/MWCNTs catalysts, it is important to note that no alkali is used in the reaction system of the present study. Applicability of Co/MWCNTs catalysts for $NaBH_4$ hydrolysis is important due to the fact that MWCNTs is the most attractive support because it possesses a high surface area and also doesn't have acid/base sites that can cause side reactions. It was also reported that the high porosity of MWCNTs derives from both inner channels and spaces or openings among individual nanotubes in bundles. In addition, the nanotube wall surface defects and holes could provide additional sites for the adsorption of metal or metal oxide nanoparticles [71]. As shown in FIG. 8C, the Constable-plot (lnA versus $E_a$ values) for the Co/MWCNTs catalysts exhibited a good linear fit with a positive slope, which is an indication of the kinetic compensation effect where the Arrhenius plots acquire close values of the rate [72].

$NaBH_4$ hydrolysis reaction mechanism involves four kinetic steps [36, 63, 72]: (i) $BH_4^-$ ion chemisorption on a catalyst's electron-deficient centre, (ii) hydride ion (H) transfer to an unoccupied metal ion in the catalyst, (iii) formation of $H_2$, $OH^-$ and $BH_3$ via the interaction of H and $H_2O$ and (iv) reaction of the nascent OH ion with $BH_3$ yielding $BH_3(OH)^-$ intermediate. This cycle continues till all the hydrogen atoms are replaced by hydroxyl ions forming $B(OH)_4^-$ and associated with the release of hydrogen molecules. Adsorption of both $BH_4^-$ and $H_2O$ reactants proceeds on two different active metal species or on the same with different electronic structures [36, 63, 73]. Andrieux et al [73] suggested that $Co^0$ and $Co^{\delta+}$ species are the adsorption sites for $BH_4^-$ and $H_2O$ reactants in a catalyst which contained cobalt nanoparticles. For $Co_2P$ nanowires catalyst, Co and P atoms were proposed as the adsorption sites, respectively [66]. An electron-rich ($Co^{2+}$) and electron-deficient ($Co^{3+}$) sites were also proposed as the adsorption sites for $BH_4^-$ and $H_2O$ over $Co_3O_4/C$ catalyst [36].

Figure 9:
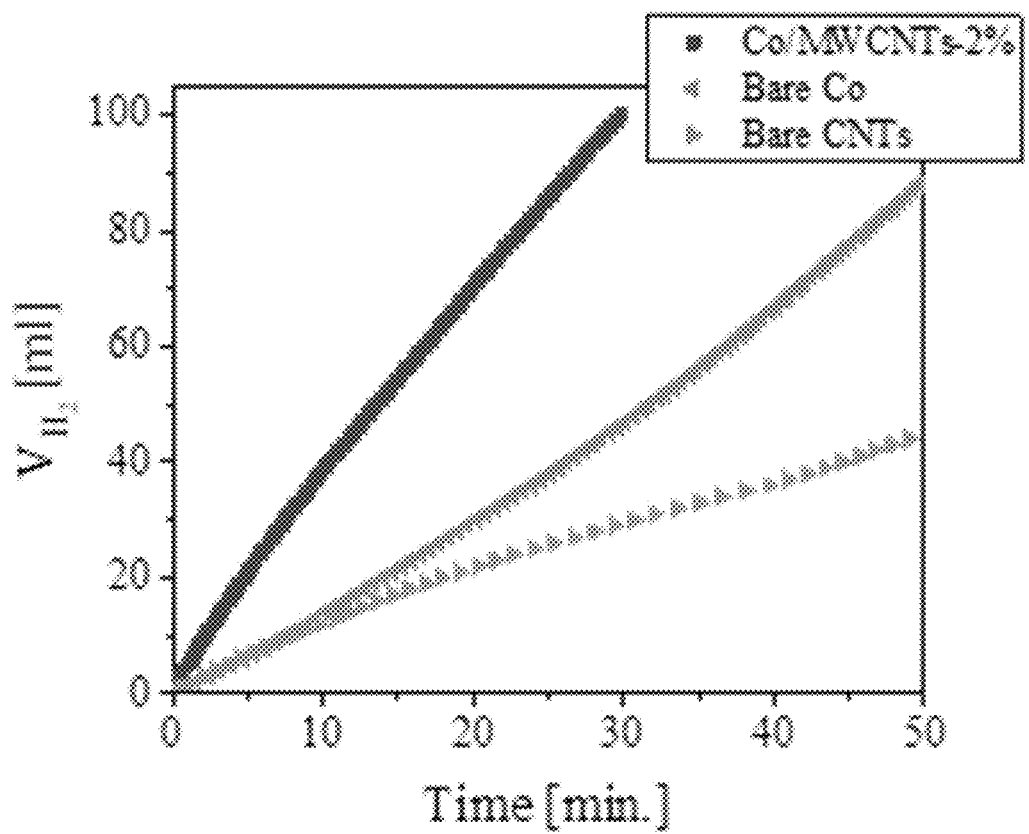
FIG. 9 shows a graph representing activities of bulk Co oxide, bulk MWCNTs, and Co/MWCNTs-2 catalyst in reactions comprising 30 mg of each catalyst at reaction temperature of 35° C.

FIG. 9 compares the activity performance of bulk Co oxide and bulk MWCNTs with that of Co/MWCNTs-2 catalyst in the reaction performed under a reaction condition comprising 30 mg of the catalyst at reaction temperature of 35° C. The results indicate that the hydrogen evolved using the bulk MWCNTs is very close to that of obtained from the self-hydrolysis of $NaBH_4$ (blank test). Therefore, the utilized MWCNTs in the present study does not have a in the $NaBH_4$ hydrolysis. A similar result was observed in case of the carbon NPs obtained from the calcination of basil leaf extract [36]. The bulk Co oxide sample which is composed of $Co_3O_4$ and CoO mixture exhibited considerable activity for the $NaBH_4$ hydrolysis. Loading of 2 wt. % cobalt over MWCNTs leads to significant increase in catalytic hydrolysis activity. This activity enhancement could be attributed to increase in the active sites for $NaBH_4$ hydrolysis as previously reported in case of CoB supported $SiO_2$ catalysts [63]. The XPS results (FIG. 6A-C) clearly indicate the co-existence of $Co^{2+}$ and $Co^{3+}$ species on the surface of the synthesized catalysts. Therefore, the electron-rich and electron-deficient sites presented in the Co/MWCNTS catalysts are responsible for adsorption of the $BH_4^-$ and $H_2O$ species.

Recycling Test

Figure 10A:
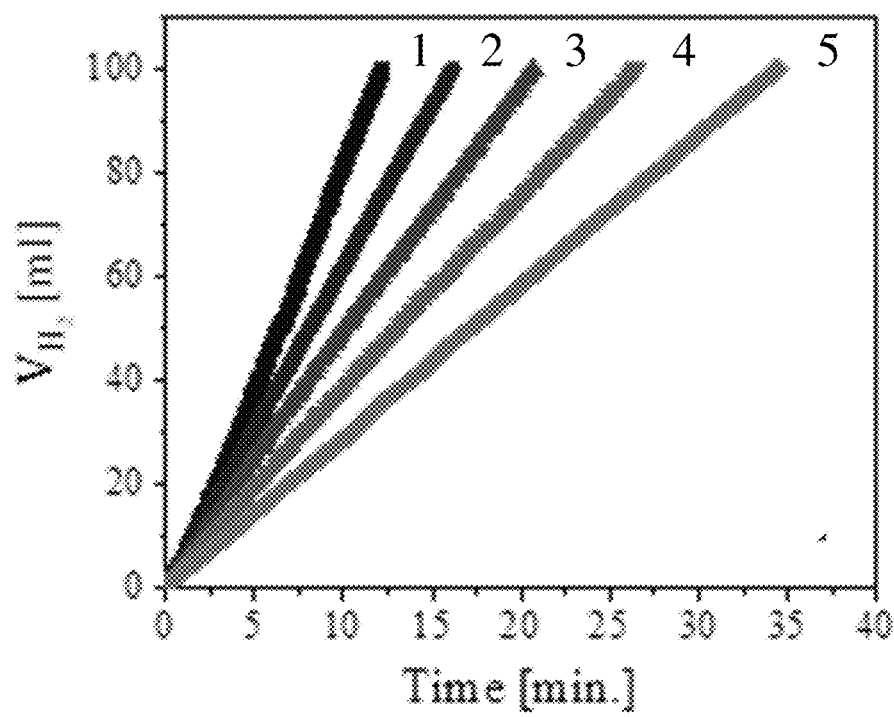
FIGS. 10A-B show recycling tests performed in a reaction comprising Co/MWCNTs-20 measuring (A) $V_{H2}$ and (B) hydrogen generation rate (HGR), according to an embodiment of the subject matter described in the disclosure.
Figure 10B:
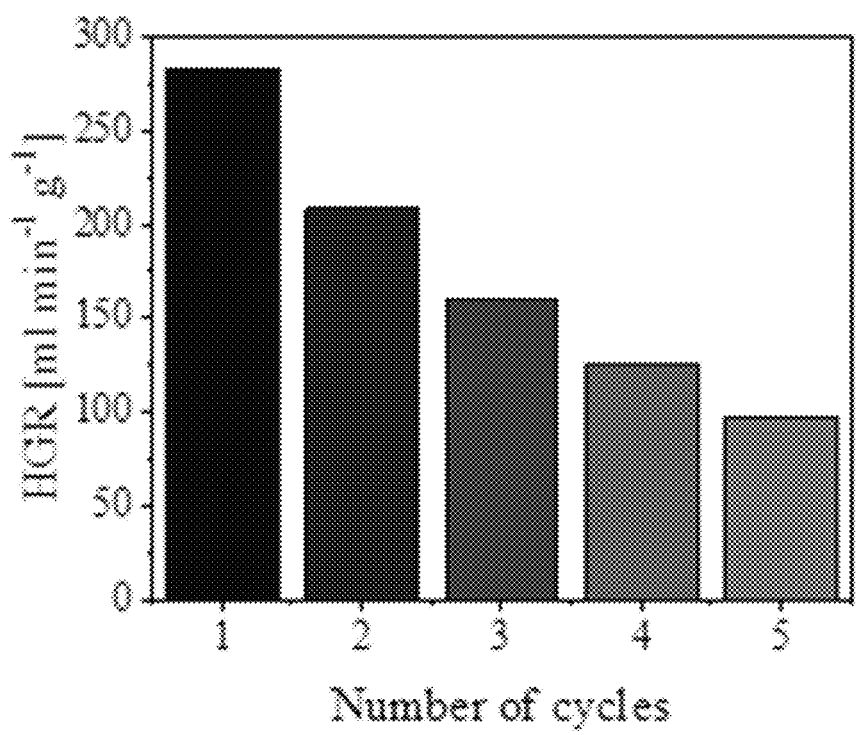

To test the reusability of the synthesized catalysts in the $NaBH_4$ hydrolysis, the catalytic performance of each catalyst was evaluated for five cycles under the same reaction condition (i.e., 30 mg of catalyst at 30° C.). At the end of each cycle, the catalyst was removed and washed several times with distilled water in order to remove the adsorbed species from its surface. The data for the most active catalyst Co/MWCNTs-20 is presented in FIG. 10A-B. In FIG. 10A, the obtained $V_{H_2}$ vs time plots for five cycles are shown. Linearity is observed with a continuous decrease of slope, which indicates a gradual decrease of catalytic activity during the recycling process. The computed HGRs (FIG. 10B) were 283, 208, 161, 126, and 97 mL $min^{-1}$ $g^{-1}$ for $1^{st}$, $2^{nd}$, $3^{rd}$, $4^{th}$, and $5^{th}$ cycle, respectively. Similar gradual loss of catalytic activity during the recycling process in $NaBH_4$ hydrolysis reaction was reported for other catalyst systems [36, 66, 68]. The formation of much strongly adsorbed borates and/or the occurrence of some textural and morphological change in the catalyst were also observed for the deactivation.

CONCLUSIONS

In this study, cobalt oxide (2, 5, 10, 20 and 30 wt. %) supported on MWCNTs catalysts were prepared by the impregnation method. The structure, morphology, texture, surface atomic composition and reducibility of catalysts were studied by XRD, SEM, TEM, $N_2$-adsorption, XPS and $H_2$-TPR methods, respectively. The dispersion and size of the cobalt oxide particles over MWCNTs support were influenced by the Co loading, i.e., large particles with low dispersion were observed in the case of Co/MWCNTs-30 sample. The $H_2$-TPR results indicate that the impregnation of cobalt oxide on MWCNTs support result in a significant improvement in reducibility of the cobalt species as the reduction of cobalt oxide species occurred at a lower temperature. The synthesized catalysts were utilized for the hydrolysis of sodium borohydride to produce hydrogen. The effect of Co loading, reaction temperature, and reaction time were investigated on the performance of the catalysts in hydrolysis of $NaBH_4$. The hydrogen generation rate was found to be 409 $mLg^{-1}min^{-1}$ at 35° C. for Co/MWCNTs-20 catalyst in $NaBH_4$ hydrolysis, while it is 28 $mLg^-min^{-1}$ for bulk MWCNTs support. The optimum concentration of the surface Co active sites and superior sodium borohydride hydrolysis activity for Co/MWCNTs catalysts were achieved at cobalt loading of 20-30 wt. %. The activity results also suggested that Co/MWCNTs catalysts can be reused for five cycles with only a slight loss of activity. Embodiments of the disclosure provide a method for generating hydrogen at a remarkably high hydrogen generation rate of 990 mL $g^{-1}min^{-1}$ at 35° C., which was achieved without using alkali.

ACKNOWLEDGEMENT

This project was funded by the Deanship of Scientific Research (DSR) at King Abdulaziz University, Jeddah, under grant no. S-32-130-1440. The authors, therefore, acknowledge with thanks DSR and Saudi Basic Industries Corporation (Sabic) for technical and financial support.

It is to be understood that this invention is not limited to any particular embodiment described herein and may vary. It is also to be understood that the terminology used herein is for the purpose of describing particular embodiments only, and is not intended to be limiting, since the scope of the present invention will be limited only by the appended claims.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

REFERENCES

[1] Schlapbach L, Zuttel A, Hydrogen-storage materials for mobile applications. Nature 2001; 414: 353-358.
[2] Jain I P, Jain P, Jain A, Novel hydrogen storage materials: A review of lightweight complex hydrides, J Alloys Compd 2010; 503: 303-339.
[3] Muir S S, Yao X, Progress in sodium borohydride as a hydrogen storage material: Development of hydrolysis catalysts and reaction systems. Int J Hydrogen Energy 2011; 36: 5983-5997.
[4] Patel N, Miotello A, Progress in Co—B related catalyst for hydrogen production by hydrolysis of boron-hydrides: A review and the perspectives to substitute noble metals. Int J Hydrogen Energy 2015; 40: 1429-1464.
[5] Demirci U B, Akdim O, Hannauer J, Cobalt, a reactive metal in releasing hydrogen from sodium borohydride by hydrolysis: A short review and a research perspective. Sci China Chem 2010; 53: 1870-1879.
[6] Manna J, Roy B, Vashistha M, Effect of $Co^{+2}/BH_4^-$ ratio in the synthesis of Co—B catalysts on sodium borohydride hydrolysis. Int J Hydrogen Energy 2014; 39: 406-413.
[7] Zabielaite A, Balčiūnaitė A, Stalnionienė I, Lichušina S, Šimkūnaitė D, Vaičiūnienė J, Šimkūnaitė-Stanynienė B, A. Selskis, Tamašauskaitė-Tamašiūnaitė L, Norkus E. Fiber-shaped Co modified with Au and Pt crystallites for enhanced hydrogen generation from sodium borohydride. Int J Hydrogen Energy 2018; 43: 23310-23318.
[8] Dai P, Zhao X, Xu D, Wang C, Tao X, Liu X, Gao J. Preparation, characterization, and properties of $Pt/Al_2O_3$/cordierite monolith catalyst for hydrogen generation from hydrolysis of sodium borohydride in a flow reactor. Int J Hydrogen Energy 2019; 44: 28463-28470.
[9] Soltani M, Zabihi M. Hydrogen generation by catalytic hydrolysis of sodium borohydride using the nano-bimetallic catalysts supported on the core-shell magnetic nanocomposite of activated carbon. Int J Hydrogen Energy 2020; 45: 12331-12346.
[10] Simagina V I, Storozhenko P A, Netskina O V, Komova O V, Odegova G V, Larichev Y V, Ishchenko A V, Ozerova A M, Development of catalysts for hydrogen generation from hydride compounds. Catal Today 2008; 138: 253-259.
[11] Duman S, Özkar S. Ceria supported manganese(0) nanoparticle catalysts for hydrogen generation from the hydrolysis of sodium borohydride. Int J Hydrogen Energy 2018; 43: 15262-15274.
[12] Wang X, Liao J, Li H, Wang H, Wang R, Pollet B G, Ji S. Highly active porous Co—B nanoalloy synthesized on liquid-gas interface for hydrolysis of sodium borohydride. Int J Hydrogen Energy 2018; 43: 17543-17555.
[13] Tignol P, Demirci U B. Nickel-based catalysts for hydrogen evolution by hydrolysis of sodium borohydride: from structured nickel hydrazine nitrate complexes to reduced counterparts. Int J Hydrogen Energy 2019; 44: 14207-14216.
[14] Al-Thabaiti S A, Khan Z, Malik M A. Bimetallic Ag—Ni nanoparticles as an effective catalyst for hydrogen generation from hydrolysis of sodium borohydride. Int J Hydrogen Energy 2019; 44: 16452-16466.
[15] Demirci U B, Garin F, Promoted sulphated-zirconia catalysed hydrolysis of sodium tetrahydroborate Catal Commun 2008; 9: 1167-1172.
[16] Wang Y, Zou K, Zhang D, Cao Z, Zhang K, Xie Y, Zhou G, Li G, Bai S. Cobalt-copper-boron nanoparticles as catalysts for the efficient hydrolysis of alkaline sodium borohydride solution. Int J Hydrogen Energy 2020; 45: 9845-9853.
[17] Didehban A, Zabihi M, Shahrouzi J R. Experimental studies on the catalytic behavior of alloy and core-shell supported Co—Ni bimetallic nano-catalysts for hydrogen generation by hydrolysis of sodium borohydride. Int J Hydrogen Energy 2018; 43: 20645-20660.
[18] Filiz B C, Figen A K. Hydrogen production from sodium borohydride originated compounds: Fabrication of electrospun nano-crystalline $Co_3O_4$ catalyst and its activity. Int J Hydrogen Energy 2019; 44: 9883-9895.
[19] Zhao J, Ma H, Chen J, Improved hydrogen generation from alkaline $NaBH_4$ solution using carbon-supported Co—B as catalysts, Int J Hydrogen Energy 2007; 32: 4711-4716.
[20] Xu D, Dai P, Liu X, Carbon-supported cobalt catalyst for hydrogen generation from alkaline sodium borohydride solution. J Power Sources 2008; 182: 616-620.

[21] Iijima S, Helical microtubules of graphitic carbon. Nature 1991; 354: 56-58.

[22] Tsang S C, Harris P J F, Green M L H, Thinning and opening of carbon nanotubes by oxidation using carbon dioxide. Nature 1993; 362: 520-522.

[23] Baughman R H, Zakhidov A A, de Heer W A, Carbon nanotubes—the route toward applications. Science 2002; 297: 787-792.

[24] Poudel Y R, Li W, Synthesis, properties, and applications of carbon nanotubes filled with foreign materials: a review. Mater Today Phys 2018; 7: 7-34.

[25] Treacy M M J, Ebbesen T W, Gibson J M, Nature 1996; 381: 678-680.

[26] Peng B, Locascio M, Zapol P, Li S, Mielke S L, Schatz G C, Espinosa H D, Measurements of near-ultimate strength for multiwalled carbon nanotubes and irradiation-induced crosslinking improvements. Nat Nanotechnol 2008; 3: 626-631.

[27] Sajid M I, Jamshaid U, Jamshaid T, Zafar N, Fessi H, Elaissari A, Carbon nanotubes from synthesis to in vivo biomedical applications. Int J Pharm 2016; 501: 278-299.

[28] Journet C, Bernier P, Production of carbon nanotubes. Appl Phys A 1998; 67: 1-9.

[29] Esteves L M, Oliveira H A, Passos F B, Carbon nanotubes as catalyst support in chemical vapor deposition reaction: A review. J Indus Eng Chem 2018; 65: 1-12.

[30] Łamacz A, Matus K, Liszka B, Silvestre-Albero J, Lafjah M, Dintzer T, Janowska I, The impact of synthesis method of CNT supported $CeZrO_2$ and $Ni—CeZrO_2$ on catalytic activity in WGS reaction. Catal Today 2018; 301: 172-182.

[31] Sun Y, Chen L, Bao Y, Wang G, Zhang Y, Fu M, Wu J, Ye D, Roles of nitrogen species on nitrogen-doped CNTs supported $Cu—ZrO_2$ system for carbon dioxide hydrogenation to methanol. Catal Today 2018; 307: 212-223.

[32] Dasireddy V D B C, Likozar B, Selective photocatalytic oxidation of benzene to phenol using carbon nanotube (CNT)-supported Cu and $TiO_2$ heterogeneous catalysts. J Taiwan Inst Chem Eng 2018; 82: 331-341.

[33] Saharan P, Sharma A K, Kumar V, Kaushal I, Multifunctional CNT supported metal doped $MnO_2$ composite for adsorptive removal of anionic dye and thiourea sensing. Mater Chem Phys 2019; 221: 239-249.

[34] Darband Gh B, Aliofkhazraei M, Rouhaghdam A S, Three-dimensional porous Ni-CNT composite nanocones as high performance electrocatalysts for hydrogen evolution reaction. J Electroanal Chem 2018; 829: 194-207.

[35] da Silva V A, Rezende M C, Effect of the morphology and structure on the microwave absorbing properties of multiwalled carbon nanotube filled epoxy resin nanocomposites. Mater Res 2018: 21: e20170977.

[36] Abu-Zied B M, Alamry K A, Green synthesis of 3D hierarchical nanostructured $Co_3O_4$/carbon catalysts for the application in sodium borohydride hydrolysis, J Alloys Compd 2019; 798: 820-831.

[37] Wang F, Arai S, Endo M, The preparation of multiwalled carbon nanotubes with a Ni—P coating by an electroless deposition process, Carbon 2005; 43: 1716-1721.

[38] Cao A, Xu C, Liang J, Wu D, Wei B, X-ray diffraction characterization on the alignment degree of carbon nanotubes. Chem Phys Lett 2001; 344: 13-17.

[39] Abu-Zied B M, Hussein M A, Khan A, Asiri A M, $Cu—Cu_2O$@graphene nanoplatelets nanocomposites; Facile synthesis, characterization, and electrical conductivity properties. Mater Chem Phys 2018; 213: 168-176.

[40] Romero-Guzmán L, Reyes-Gutiérrez L R, Romero-Guzmán E T, Savedra-Labastida E, Carbon nanotube filters for removal of air pollutants from mobile sources. J Min Mater Characterization Eng 2018; 6: 105-118.

[41] Das R, Abd Hamid S B, Ali Md E, Ramakrishna S, Yongzhi W, Carbon Nanotubes Characterization by X-ray Powder Diffraction—A Review. Current Nanosci 2015; 11: 23-35.

[42] Arteaga G, Rivera-Gavidia L M, Martínez S J, Rizo R, Pastor E, Garcia G, Methanol oxidation on graphenic-supported platinum catalysts, Surfaces 2019; 2: e2.

[43] Chen W, Fan Z, Pan X, Bao X, Effect of Confinement in carbon nanotubes on the activity of Fischer-Tropsch iron catalyst, J Am Chem Soc 2008; 130: 9414-9419.

[44] Trépanier M, Dalai A K, Abatzoglou N, Synthesis of CNT-supported cobalt nanoparticle catalysts using a microemulsion technique: Role of nanoparticle size on reducibility, activity and selectivity in Fischer—Tropsch reactions. Appl Catal A 2010; 374: 79-86.

[45] Karimi A, Nasernejad B, Rashidi A M, Tavasoli A, Pourkhalil M, Functional group effect on carbon nanotube (CNT)-supported cobalt catalysts in Fischer—Tropsch synthesis activity, selectivity and stability. Fuel 2014; 117: 1045-1051.

[46] Sing K S W, Reporting Physisorption Data for Gas/Solid Systems with Special Reference to the Determination of Surface Area and Porosity, Pure Appl Chem 1985; 57: 603-619.

[47] Sing K S W, Williams R T, Physisorption Hysteresis Loops and the Characterization of Nanoporous Materials, Ads Sci Technol 2004; 22: 773-782.

[48] Tavasoli A, Trépanier M, Abbaslou R M M, Dalai A K, Abatzoglou N, Fischer-Tropsch synthesis on mono- and bimetallic Co and Fe catalysts supported on carbon nanotubes; Fuel Process Technol 2009; 90: 1486-1494.

[49] Yu Z X, Borg O, Chen D, Enger B C, Froseth V, Rytter E, Wigum H, Holmen A, Carbon Nanofiber Supported Cobalt Catalysts for Fischer—Tropsch Synthesis with High Activity and Selectivity, Catal Lett 2006; 109: 43-47.

[50] Khodakov A Y, Griboval-Constant A, Bechara R, Zholobenko V L, Pore Size Effects in Fischer Tropsch Synthesis over Cobalt-Supported Mesoporous Silicas, J Catal 2002; 206: 230-24.

[51] Chernyaka S A, Suslova E V, Ivanov A S, Egorov A V, Maslakov K I, Savilov S V, Lunin V V, Co catalysts supported on oxidized CNTs: Evolution of structure during preparation, reduction and catalytic test in Fischer-Tropsch synthesis; Appl Catal A 2016; 523: 221-229.

[52] Fu T, Liu R, Lv J, Li Z, Influence of acid treatment on N-doped multi-walled carbon nanotube supports for Fischer—Tropsch performance on cobalt catalyst; Fuel Process Technol 2014; 122: 49-57.

[53] Abu-Zied B M, A novel foam combustion approach for the synthesis of nano-crystalline cobalt oxide powder, Ceram Int 2019; 45: 4540-4548.

[54] Chuang T J, Brundle C R, Rice D W, Interpretation of the X-ray photoemission spectra of cobalt oxides and cobalt oxide surfaces, Surf Sci 1976; 59: 413-429

[55] Wang Y, Hu X, Zheng K, Wei X, Zhao Y, Effect of $SnO_2$ on the structure and catalytic performance of $Co_3O_4$ for $N_2O$ decomposition, Catal Commun 2018; 111: 70-74.

[56] Abu-Zied B M, Bawaked S M, Kosa S A, Schwieger W, Effect of microwave power on the thermal genesis of $Co_3O_4$ nanoparticles from cobalt oxalate micro-rods, Appl Surf Sci 2015; 351: 600-609.

[57] Wang Z, Zhang X, Sun Y, Zhang H, Wang C, Xie A, Facile synthesis and electrochemical performance of nitrogen-doped porous hollow coaxial carbon fiber/$Co_3O_4$ composite, Ceram Int 2018; 44: 5848-5854.

[58] Biesinger M C, Payne B P, Grosvenor A P, Lau L W M, Gerson A R, Smart R S C, Resolving surface chemical states in XPS analysis of first row transition metals, oxides and hydroxides: Cr, Mn, Fe, Co and Ni, Appl Sur Sci 2011; 257: 2717-2730.

[59] Okpalugo T I T, Papakonstantinou P, Murphy H, McLaughlin J, Brown N M D, High resolution XPS characterization of chemical functionalised MWCNTs and SWCNTs, Carbon 2005; 43: 153-161.

[60] Zhang X, Zhou Y, Mao Y, Wei M, Chu W, Huang K, Rapid synthesis of ultrafine $NiCo_2O_4$ nanoparticles loaded carbon nanotubes for lithium ion battery anode materials, Chem Phy Lett 2019; 715: 278-283.

[61] Dai H-B, Liang Y, Wang P, Effect of trapped hydrogen on the induction period of cobalt-tungsten-boron/nickel foam catalyst in catalytic hydrolysis reaction of sodium borohydride, Catal Today 2011; 170: 27-32.

[62] Durano M M, Tamboli A H, Kim H, Cobalt oxide synthesized using urea precipitation method as catalyst for the hydrolysis of sodium borohydride, Colloids Surf A 2017; 520: 355-360.

[63] Yang C-C, Chen M-S, Chen Y-W, Hydrogen generation by hydrolysis of sodium borohydride on $CoB/SiO_2$ catalyst, Int J Hydrogen Energy 2011; 36: 1418-1423.

[64] Niu W, Ren D, Han Y, Wu Y, Gou X, Optimizing preparation of carbon supported cobalt catalyst for hydrogen generation from $NaBH_4$ hydrolysis, J Alloys Compd 2012; 543: 159-166.

[65] Liu B H, Li Z P, Suda S, Nickel- and cobalt-based catalysts for hydrogen generation by hydrolysis of borohydride, J Alloys Compd 2006; 415: 288-293.

[66] Lu A, Chen Y, Jin J, Yue G-H, Peng D-L, CoO nanocrystals as a highly active catalyst for the generation of hydrogen from hydrolysis of sodium borohydride, J Power Sources 2012; 220: 391-398.

[67] Loghmani M H, Shojaei A F, Synthesis and characterization of Co—La—Zr—B quaternary amorphous nano alloy: Kinetic study for hydrogen generation from hydrolysis of sodium borohydride, J Alloys Compd 2013; 580: 61-66.

[68] Zhang X, Sun X, Xu D, Tao X, Dai P, Guo Q, Liu X, Synthesis of MOF-derived Co@C composites and application for efficient hydrolysis of sodium borohydride, Appl Surf Sci 2019; 469: 764-769.

[69] Ozerova A M, Simagina V I, Komova O V, Netskina O V, Odegova G V, Bulavchenko O A, Rudina N A, Cobalt borate catalysts for hydrogen production via hydrolysis of sodium borohydride, J Alloys Compd 2012; 513: 266-272.

[70] Huang X, Wu D, Cheng D, Porous $Co_2P$ nanowires as high efficient bifunctional catalysts for 4-nitrophenol reduction and sodium borohydride hydrolysis, J Colloid Interface Sci 2017; 507: 429-436.

[71] Kazakova M A, Morales D M, Andronescu C, Elumeeva K, Selyutin A G, Ishchenko A V, et al. Fe/Co/Ni mixed oxide nanoparticles supported on oxidized multi-walled carbon nanotubes as electrocatalysts for the oxygen reduction and the oxygen evolution reactions in alkaline media. Catal Today 2019.

[72] Bond G C, Keane M A, Kral H, Lercher J A, Compensation phenomena in heterogeneous catalysis: general principles and a possible explanation, Catal Rev Sci Eng. 2000; 42: 323-383.

[73] Andrieux J, Demirci U B, Miele P, Langmuire-Hinshelwood kinetic model to capture the cobalt nanoparticles-catalyzed hydrolysis of sodium borohydride over a wide temperature range, Catal Today 2011; 170: 13-19.

What is claimed is:

1. A method for making a carbon nanotube-based catalyst, comprising:
mixing cobalt acetate with multi-wall carbon nanotubes (MWCNTs) in a solvent to produce a solution, wherein the MWCNTs comprise nested single-wall carbon nanotubes at a purity of >99%;
drying the solution at 70-95° C. to form a powder; and
annealing the powder at 400-600° C. to produce cobalt-incorporated multi-wall carbon nanotubes (Co/MWCNTs).

2. The method of claim 1, wherein the solvent is an organic solvent selected from the group consisting of ethanol, propanol, and isopropanol.

3. The method of claim 1, wherein the solvent is an aqueous solution.

4. The method of claim 1, wherein the drying step is performed for 12-16 hours.

5. The method of claim 1, wherein the annealing step is performed for 30-120 hours.

6. The method of claim 1, wherein a weight ratio of the cobalt acetate to the MWCNTs is 1:5 to 1:2.5.

7. The method of claim 6, wherein a weight ratio of the cobalt acetate to the MWCNTs is 1:4 to 1:2.8.

8. The method of claim 1, wherein the method does not include adding a metal salt other than the cobalt acetate.

9. The method of claim 1, wherein the Co/MWCNTs catalyst has a cobalt incorporation amount of 20-35 wt %.

10. A method of using cobalt-incorporated multi-wall carbon nanotubes (Co/MWCNTs) in hydrogen production, comprising:
mixing Co/MWCNTs produced by the method of claim 1 with aqueous sodium borohydride ($NaBH_4$) under reaction conditions suitable for a $NaBH_4$ hydrolysis reaction to release hydrogen; and
collecting the released hydrogen.

11. The method of claim 10, wherein the method does not include a step of adding alkali.

12. The method of claim 10, wherein the mixing and collecting steps are performed at 25-45° C.

13. The method of claim 10, wherein the mixing and collecting steps are performed at 30-35° C.

14. A method for making a carbon nanotube-based catalyst, the method consisting of:
mixing a cobalt acetate with multi-wall carbon nanotubes (MWCNTs) in a solvent to produce a solution;
drying the solution at 70-95° C. to form a powder; and
annealing the powder at 400-600° C. to produce cobalt-incorporated multi-wall carbon nanotubes (Co/MWCNTs).

15. The method of claim 14, wherein the Co/MWCNTs catalyst has a cobalt incorporation amount of 20-35 wt %.

* * * * *